(12) United States Patent
Sharrow

(10) Patent No.: US 12,448,098 B2
(45) Date of Patent: *Oct. 21, 2025

(54) PROPELLER

(71) Applicant: Sharrow Engineering LLC, Shelby Township, MI (US)

(72) Inventor: Gregory Charles Sharrow, Grosse Pointe Park, MI (US)

(73) Assignee: Sharrow Engineering LLC, Shelby Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,753

(22) Filed: Jun. 11, 2024

(65) Prior Publication Data

US 2024/0336341 A1 Oct. 10, 2024

Related U.S. Application Data

(63) Continuation of application No. 18/194,994, filed on Apr. 3, 2023, now Pat. No. 12,030,606, which is a
(Continued)

(51) Int. Cl.
*B63H 1/26* (2006.01)
*B64C 11/00* (2006.01)
(Continued)

(52) U.S. Cl.
CPC .............. *B63H 1/265* (2013.01); *B64C 11/00* (2013.01); *B64C 11/005* (2013.01); *B64C 11/16* (2013.01); *B64C 11/18* (2013.01); *B64C 11/20* (2013.01); *F01D 5/141* (2013.01); *F03D 1/06* (2013.01); *F03D 1/0625* (2013.01); *F04D 29/384* (2013.01); *F04D 17/025* (2013.01);
(Continued)

(58) Field of Classification Search
CPC ....... B63H 1/265; B64C 11/005; B64C 11/16; B64C 11/18
See application file for complete search history.

(56) References Cited

U.S. PATENT DOCUMENTS 868,220 A 10/1907 Portelli
917,217 A 4/1909 Weston
(Continued)

FOREIGN PATENT DOCUMENTS

CA 37791 11/1891
CA 39504 7/1892
(Continued)

OTHER PUBLICATIONS

A Breakthrough in Propulsion, available in BoatUS.com, announced Year 2020 [online], [site visited Jun. 29, 2023], Internet URL: https://www.boatus.com/expert-advice/expert-advice-archive/2020/august/a-breakthrough-in-propulsion.
(Continued)

*Primary Examiner* — Michael L Sehn
(74) *Attorney, Agent, or Firm* — Barnes & Thornburg LLP; Steven D. Shipe

(57) ABSTRACT

A propeller having a plurality of blades extending radially outward from a hub, the blades forming a loop. Each loop can have an intake portion, an exhaust portion and a tip portion extending radially outward from the hub and a gap between the intake root and the exhaust root.

10 Claims, 56 Drawing Sheets

Related U.S. Application Data continuation of application No. 17/577,587, filed on Jan. 18, 2022, now Pat. No. 11,649,026, which is a continuation of application No. 15/897,767, filed on Feb. 15, 2018, now Pat. No. 11,273,892, which is a continuation of application No. 15/605,764, filed on May 25, 2017, now Pat. No. 9,926,058.

(60) Provisional application No. 62/508,139, filed on May 18, 2017, provisional application No. 62/342,284, filed on May 27, 2016.

(51) Int. Cl.
*B64C 11/16* (2006.01)
*B64C 11/18* (2006.01)
*B64C 11/20* (2006.01)
*F01D 5/14* (2006.01)
*F03D 1/06* (2006.01)
*F04D 29/38* (2006.01)
*F04D 17/02* (2006.01)
*F04D 29/28* (2006.01)

(52) U.S. Cl.
CPC ........ *F04D 29/281* (2013.01); *F05B 2210/16* (2013.01); *F05B 2250/24* (2013.01); *F05B 2250/25* (2013.01); *F05B 2250/26* (2013.01)

(56) References Cited

U.S. PATENT DOCUMENTS

| | | | |
|---|---|---|---|
| 1,868,113 A | 7/1932 | Ljungstrom | |
| 2,045,383 A | 6/1936 | Faber | |
| 2,048,383 A | 7/1936 | Holt | |
| 2,273,756 A | 2/1942 | Hoenrkamp | |
| 2,344,266 A | 3/1944 | Reissner | |
| 2,473,665 A | 6/1949 | Nort | |
| 2,687,182 A | 8/1954 | Hogan | |
| 3,087,553 A | 4/1963 | Kostyun | |
| 3,485,462 A | 12/1969 | Spence | |
| 3,504,990 A | 4/1970 | Sugden | |
| D223,218 S | 3/1972 | Martens | |
| 4,135,858 A | 1/1979 | Entat | |
| 4,797,066 A | 1/1989 | Stroemberg | |
| 4,802,872 A | 2/1989 | Stanton | |
| D316,700 S | 5/1991 | Morrison | |
| 5,111,576 A | 5/1992 | Kuhnle | |
| D355,252 S | 2/1995 | Andersen | |
| 5,405,246 A | 4/1995 | Goldberg | |
| 5,411,330 A | 5/1995 | Arutyunov | |
| 5,411,422 A | 5/1995 | Robertson | |
| 5,890,875 A | 4/1999 | Silvano | |
| D419,669 S | 1/2000 | Shinshi | |
| 6,099,256 A * | 8/2000 | Silvano | F04D 29/325 |
| | | | 29/889.6 |
| D432,621 S | 10/2000 | Etschel | |
| D457,850 S | 5/2002 | Rietsch | |
| 6,948,910 B2 | 9/2005 | Polacsek | |
| D510,998 S | 10/2005 | Parker | |
| 7,018,167 B2 | 3/2006 | Yoshida | |
| D539,413 S | 3/2007 | Parker | |
| D560,154 S | 1/2008 | Aplin, Jr. | |
| D561,690 S | 2/2008 | Schaap | |
| D579,102 S | 10/2008 | Leung | |
| 8,376,694 B1 | 2/2013 | Beal | |
| 8,376,994 B2 | 2/2013 | Woehr | |
| D728,442 S | 5/2015 | Hawkins | |
| D745,448 S | 12/2015 | Hawkins | |
| D745,488 S | 12/2015 | Lee | |
| D750,211 S | 2/2016 | Arai | |
| D799,688 S | 10/2017 | Wang | |
| D806,225 S | 12/2017 | Chang | |
| 9,926,058 B2 | 3/2018 | Sharrow | |
| D870,260 S | 12/2019 | Teramoto | |
| D885,298 S | 5/2020 | Shima | |
| D903,573 S | 12/2020 | Shima | |
| D907,083 S | 1/2021 | Loman | |
| 11,273,892 B2 | 3/2022 | Sharrow | |
| D974,267 S | 1/2023 | Sharrow | |
| D974,268 S | 1/2023 | Sharrow | |
| D974,269 S | 1/2023 | Sharrow | |
| D974,270 S | 1/2023 | Sharrow | |
| 11,603,184 B2 | 3/2023 | Sharrow | |
| 11,649,026 B2 * | 5/2023 | Sharrow | B64C 11/18 |
| | | | 416/247 A |
| 12,030,606 B2 * | 7/2024 | Sharrow | B63H 1/26 |
| 2004/0009063 A1 | 1/2004 | Polacsek | |
| 2004/0067138 A1 | 4/2004 | Yoshida | |
| 2008/0075599 A1 | 3/2008 | Miller | |
| 2008/0096446 A1 | 4/2008 | Lin | |
| 2009/0026283 A1 | 1/2009 | Kawai | |
| 2009/0136353 A1 | 5/2009 | Beckford | |
| 2011/0299991 A1 | 12/2011 | Shpadi | |
| 2012/0056041 A1 | 3/2012 | Rhee | |
| 2012/0288374 A1 | 11/2012 | Avellan | |
| 2014/0161622 A1 | 6/2014 | Sharrow | |
| 2014/0273673 A1 | 9/2014 | Tsai | |
| 2015/0037157 A1 | 2/2015 | Tzeng | |
| 2017/0161622 A1 | 6/2017 | Kung | |
| 2017/0218772 A1 | 8/2017 | Sharrow | |
| 2017/0267323 A1 | 9/2017 | Sharrow | |
| 2018/0186439 A1 | 7/2018 | Sharrow | |
| 2018/0237122 A1 | 8/2018 | Sharrow | |
| 2019/0061892 A1 | 2/2019 | Choi | |
| 2019/0127035 A1 | 5/2019 | Mckinny, Jr. | |
| 2022/0135195 A1 | 5/2022 | Sharrow | |
| 2023/0249793 A1 | 8/2023 | Sharrow | |

FOREIGN PATENT DOCUMENTS

| | | |
|---|---|---|
| CN | 1368923 | 9/2002 |
| CN | 102808716 | 12/2012 |
| CN | 103270296 | 8/2013 |
| CN | 104340348 | 2/2015 |
| CN | 104854310 | 8/2015 |
| DE | 3723101 | 2/1989 |
| EP | 1365106 | 11/2003 |
| FR | 339176 | 12/1904 |
| FR | 357655 | 1/1906 |
| FR | 808801 | 2/1937 |
| GB | 427493 | 4/1935 |
| JP | 2003503643 | 1/2003 |
| JP | 2008090548 | 4/2008 |
| JP | 2016507410 | 3/2016 |
| RU | 2585180 | 5/2016 |
| TW | 110305685 | 9/2022 |
| WO | 02059464 | 8/2002 |
| WO | 2008105704 | 9/2008 |
| WO | 2011081577 | 7/2011 |
| WO | 2017205680 | 11/2017 |
| WO | D218408 | 1/2022 |
| WO | D218409 | 1/2022 |
| WO | D218411 | 1/2022 |
| WO | D218412 | 1/2022 |

OTHER PUBLICATIONS

Article "Integrated Design and Realization of a Hubless Rim-driven Thruster", Min-Fu Hsieh et al., Department of Systems and Naval Mechantronic Engineering, National Chen Kung University; The 33rd Annual Conference of the IEEE Industrial Electronics Society (IECON) Nov. 5-8, 2007, Taipei, Taiwan.

Article "The Characteristics of Rim-Driven Propulsor's Flow Field", Chung-Wei Lee et al., Department of Systems and Naval Mechantronic Engineering, National Chen Kung University, Taiwan (2011 or earlier).

Boatingmag.com, Marine Power Innovation Awards 2022 Sharrow Marine Propellers, published Feb. 7, 2023; retrieved from the Internet< https://www.boatingmag.com/boats/marine-power-innovation-awards-2022-sharrow-marine-propellers/> (Year: 2022).

(56) References Cited

OTHER PUBLICATIONS

Crown, D.E. and Hendrican, A.L., Cavitation Performance of Loop-Bladed Propeller 4667, Naval Ship Research Development Center, Ship Performance Departmental Report No. SPD-530-05, Jul. 1975, Bethesda, Maryland.
ebay.com, Volvo Penta C2 3588222 Duo Prop Stainless Steel Propeller, published Feb. 15, 2023; retrieved from the Internet <https://www.ebay.com/itm/163487448444?hash=item26109c7d7c:g70AAAOSwqLif-Plg> (Year: 2023).
European Search Report issued in European Patent Application No. 21174055.0 dated Jul. 28, 2021.
Examination Report No. 1 issued in Australian Patent Application 2019203301 by the Australian Patent Office dated Jun. 5, 2020.
Examination Search Report issued in Canadian Patent Application 3000830 by the Canadian Intellectual Property Office dated May 1, 2018.
Examiner Report No. 1 and Search Report issued in Chilean Patent Application 3300-2018 by the Patent Office of Chile dated Feb. 25, 2020.
Extended European Search Report dated Oct. 22, 2018 by the European Patent Office for European Patent Application No. 18191741.0.
Extended Supplementary Search Report issued in European Patent Application 17803624.0 dated Sep. 18, 2019.
Facebook.com, Sharrow Marine CX-1 Duo Propeller at IBEX, publihed Sep. 28, 2021 retrieved from the Internet <https://www.facebook.com/SharrowMarine/posts/871727786816928/?comment_id=871764706813236> (Year: 2021).
Fifth Notification of Examiner Opinion issued in Chinese Patent Application 201380063211.3 by the State Intellectual Property Office of China dated May 30, 2019.
Final Office action issued in Japanese Patent Application No. 2018-520417 dated Jul. 28, 2021.
Final Office Action issued in U.S. Appl. No. 13/843,344 dated Oct. 19, 2017.
Final Office Action issued in U.S. Appl. No. 15/489,562 dated Jun. 15, 2018.
First Examination Report dated Dec. 21, 2018 issued in Australian Patent Application No. 2017268808.
First Examination Report issued in India Patent Application 201817048599 by the India Patent Office dated Jun. 1, 2020.
First Office Action issued by the State Intellectual Property Office in Chinese Patent Application 201780003480.9 dated Jan. 2, 2019.
First Office action issued in Chinese Patent Application No. 202110123604.5 dated Feb. 11, 2023.
Fourth Notification of Examiner Opinion issued in Chinese Patent Application 201380063211.3 by the State Intellectual Property Office of China dated Mar. 27, 2019.
International Search Report and Written Opinion, dated Aug. 29, 2017, for International Patent Application PCT/US2017/034558.
Klein I: "Bionik Fuer Die Maritime Wirtschaft", Shiff Und Hafen, Seehafen Verlag GMBH, DE, vol. 59, No. 3, Jan. 1, 2007.
Miller, Marlin L., Blade Frequency Thrust and Torque on a Loop-Bladed Propeller, David W. Taylor Naval Ship Research and Development Center, Ship Performance Departmental Report No. SPD-530-06, Nov. 1975, Bethesda, Maryland.
Non Final Office Action dated Aug. 5, 2019 in U.S. Appl. No. 15/897,767.
Non-Final Office Action issued in U.S. Appl. No. 13/843,344 dated Apr. 7, 2017.
Non-Final Office Action issued in U.S. Appl. No. 15/489,562 dated Nov. 2, 2017.
Notification of Re-examination of Chinese Application 201380063211.3 issued by the State Intellectual Property Office of China dated Sep. 29, 2018.
Office Action dated Aug. 25, 2020 issued in Japanese Patent Application No. 2018-520417.
Office Action dated Mar. 28, 2022 in Taiwan Application No. 110305685.
Office Action of the Intellectual Property Office dated Nov. 1, 2018 for ROC (Taiwan) Patent Application. No. 106117755.
Office Action of the Intellectual Property Office issued in ROC (Taiwan) Patent Application. No. 106207667 dated Apr. 24, 2018.
Office Action of the Intellectual Property Office issued in ROC (Taiwan) Patent Application. No. 106207667 dated Jan. 24, 2018.
Okamoto, H., et al., Cavitation Study of Ducted Propellers on Large Ships, Society of Naval Architects and Marine Engineers, pp. 168-190, New Jersey, 1975.
Search Report issued in Russia Patent Application No. 2018145854 dated Jun. 26, 2020.
Sharrow MX-1: This tipless propeller could be be top of the props, available in MBY.com, announced Year 2020 [online], [site visited Aug. 3, 2022], Internet URL: https://www.mby.com/gear/sharrow-mx-1-tipless-propeller-110120.
Sharrow Propeller™ (2019)—Product Review Video by BoatTEST.com, announced in YouTube on Oct. 11, 2019 [online], [site visited Aug. 3, 2022], Available from the internet URL: https://www.youtube.com/watch?v=fO862IWuBdE.
State Intellectual Property Office of China Decision to Reject Application 201380063211.3 dated Jul. 12, 2017.
Substantive Examination Report issued in Philippine Patent Application No. Jan. 2018/502468 and dated Aug. 31, 2021.
Third Notification of Examiner Opinion in Chinese Patent Application 201380063211.3 issued by the State Intellectual Property Office of China dated Jan. 26, 2017.
Toroidal propellers: A noise-killing game changer in air and water, available in NewAtlas.com, announced Year 2023 [online], [site visited Jun. 29, 2023], Internet URL: https://newatlas.com/aircraft/toroidal-quiet-propellers/.

\* cited by examiner

LEFT

RIGHT

High Rake for Intake
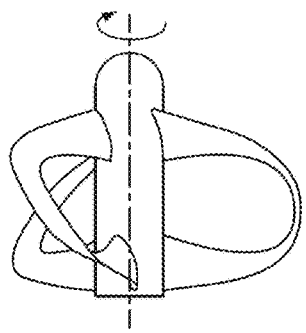
FIG. 18A ("Left")
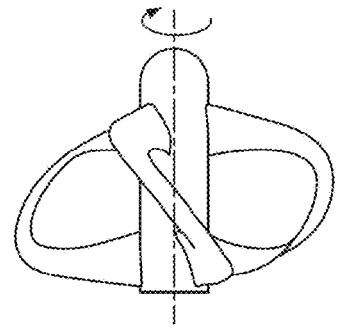
FIG. 18B ("Front")
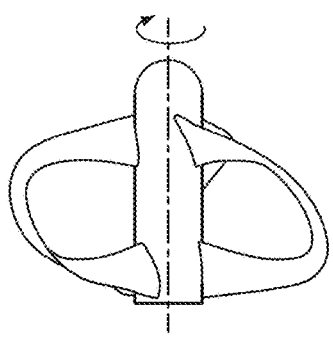
FIG. 18C (Back)
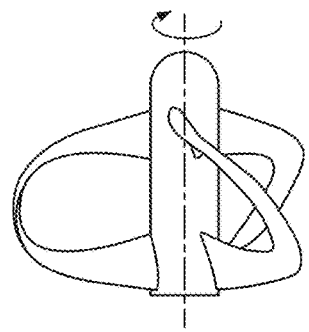
FIG. 18D (Right)
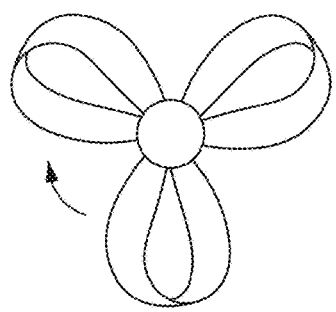
FIG. 18E (Top)
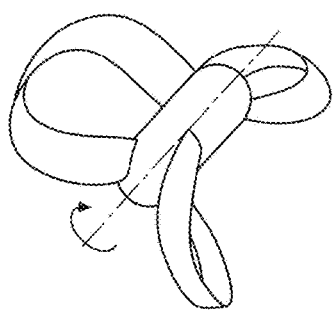
FIG. 18F (Perspective)
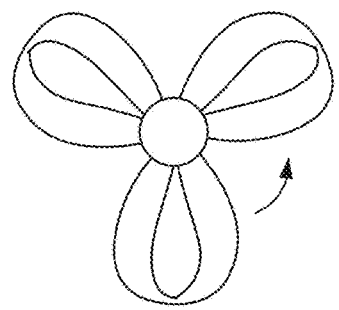
FIG. 18G (Bottom)

High Rake for Intake & Exhaust
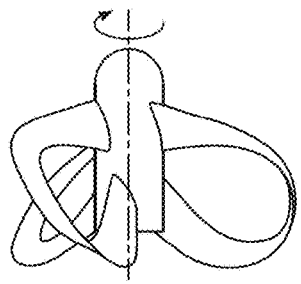
FIG. 19A ("Left")
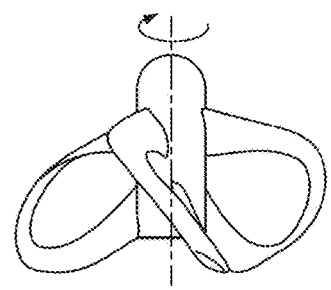
FIG. 19B ("Front")
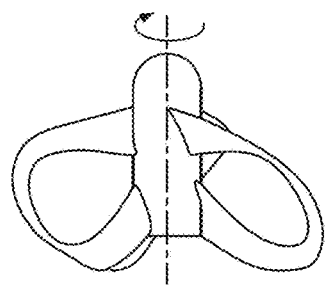
FIG. 19C (Back)
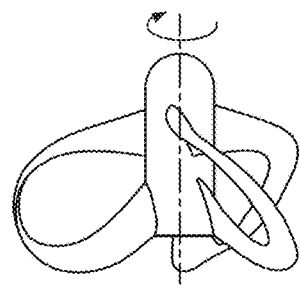
FIG. 19D (Right)
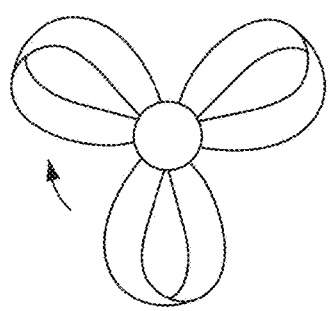
FIG. 19E (Top)
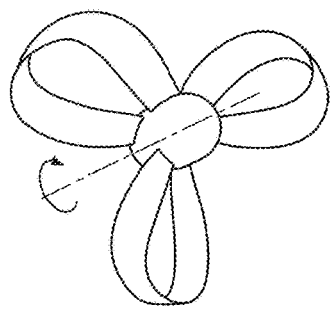
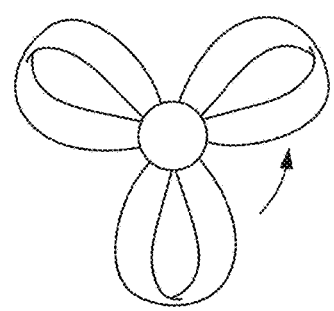
FIG. 19G (Bottom)
FIG. 19F (Perspective)

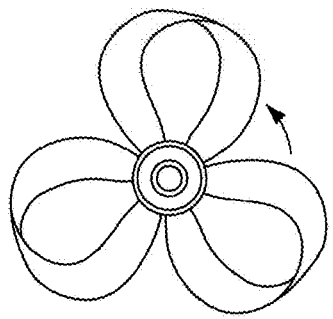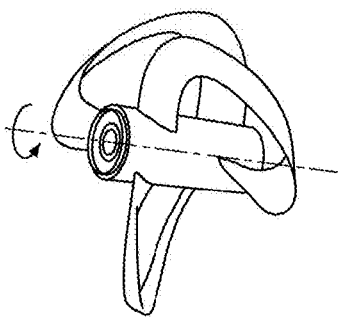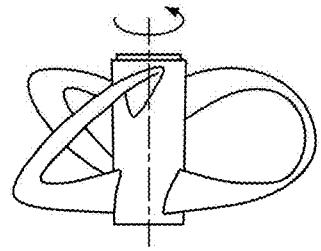
FIG. 20A ("Top")  FIG. 20B (Perspective)  FIG. 20C ("Right")
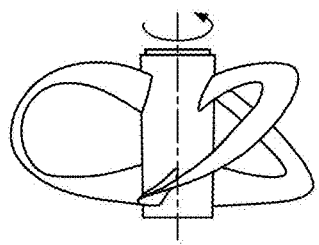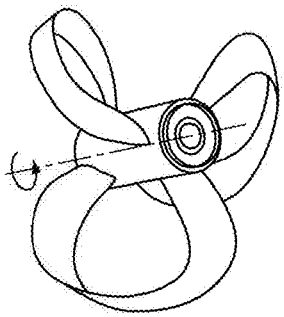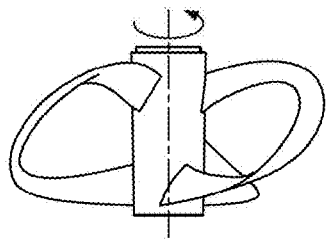
FIG. 20D ("Left")  FIG. 20E (Perspective)  FIG. 20F ("Front")
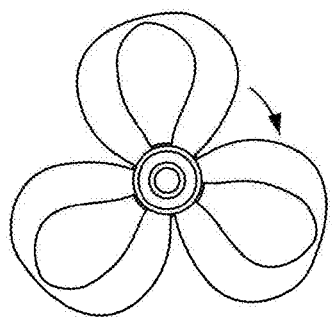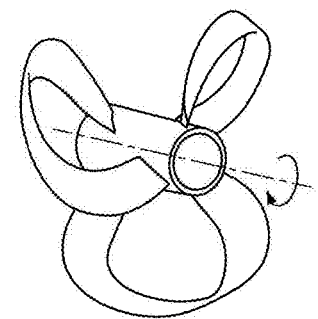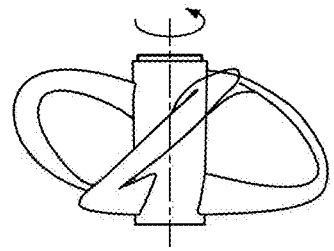
FIG. 20G (Bottom)  FIG. 20H (Perspective)  FIG. 20I ("Back")

Through Hub Exhaust
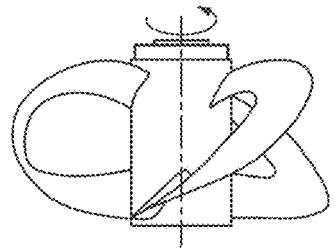
FIG. 21A ("Left")
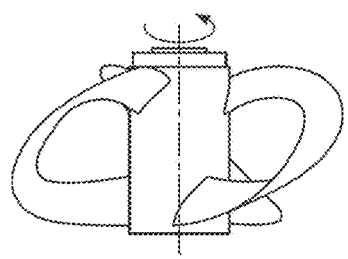
FIG. 21B ("Front")
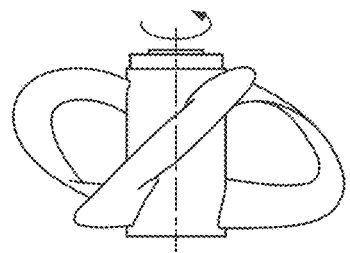
FIG. 21C ("Back")
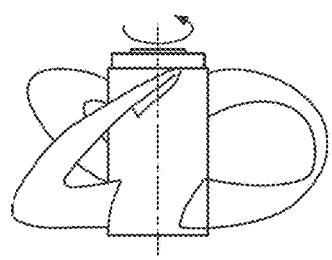
FIG. 21D ("Right")
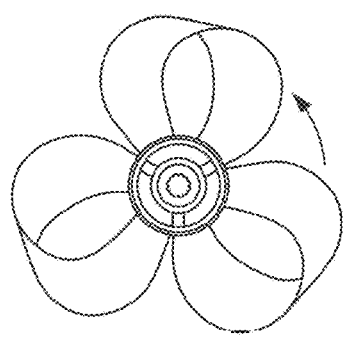
FIG. 21E (Top)
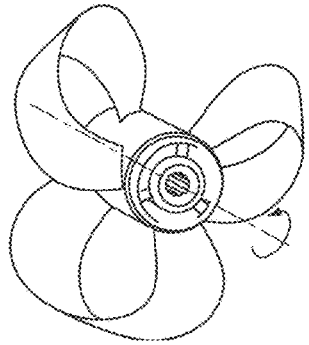
FIG. 21F (Perspective)
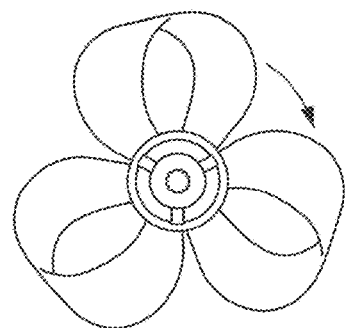
FIG. 21G (Bottom)

PROPELLER

CROSS-REFERENCE TO RELATED APPLICATIONS

This utility application is a continuation of U.S. patent application Ser. No. 18/194,994, filed Apr. 3, 2023, entitled Propeller, which is a continuation of U.S. patent application Ser. No. 17/577,587, filed Jan. 18, 2022, entitled Propeller, (now U.S. Pat. No. 11,649,026) which is a continuation of U.S. patent application Ser. No. 15/897,767, filed Feb. 15, 2018, entitled Propeller (now U.S. Pat. No. 11,273,892), which is a continuation of U.S. patent application Ser. No. 15/605,764, filed May 25, 2017, entitled Propeller (now U.S. Pat. No. 9,926,058) which claims the benefit of priority to U.S. Provisional Application No. 62/508,139, filed May 18, 2017, entitled Propeller, and to U.S. Provisional Application No. 62/342,284, filed May 27, 2016, entitled Propeller, each of the aforementioned materials being incorporated herein by reference in its entirety.

TECHNICAL FIELD OF THE INVENTION

The invention relates to propellers that may be used, for example, for aircraft, watercraft, turbines, unmanned aerial vehicles and air circulation devices.

SUMMARY

Embodiments of the invention provide a propeller that has a plurality of blades and a means for generating non-axial lift, which creates non-axial fluid flow, and a means for redirecting non-axial fluid flow to create axial fluid movement or thrust. The propeller may include a hub or be of a rim or "hubless" form. The plurality of blades either extends outward from the hub or inward from the rim. Each blade may form a loop-type structure that may be open or closed, and having an intake portion, and exhaust portion and a tip portion extending radially outward from to the hub or inward from a rim or "hubless" form. The means for generating non-axial lift and non-axial fluid flow to create axial thrust may be a configuration of the blades wherein in a cross-sectional-profile of each of the plurality of blades, the distance from the rotational axis to the leading edge of the blade is greater than the distance from the rotational axis to the trailing edge of the blade in at least part of the tip portion.

The blades may have an intake portion, an exhaust portion, and a tip portion that connects the intake and exhaust portions, but is not necessarily a discrete component. The propeller has an intake root and an exhaust root, which are at either the rim or hub, for example. The tip portion may include a roll angle of ninety degrees, wherein a roll angle of zero is at the intake root. The tip portion vertical angle and pitch angle may be positive throughout. In an exemplary embodiment the tip portion produces more non-axial lift than either the intake or the exhaust portion.

In an illustrative embodiment the transition from the intake portion to the tip portion occurs when the amount of non-axial lift produced by a given parameter section of the blade is greater than the axial lift produced.

DESCRIPTION OF THE DRAWINGS

For further detail regarding illustrative embodiments of the disclosed propeller, reference is made to the detailed description provided below, in conjunction with the following illustrations: All figures are of illustrative embodiments of the disclosed propeller.

FIGS. 18A-G depict an illustrative embodiment of a propeller with a high rake.

FIGS. 19A-G depict a further illustrative embodiment of a propeller with a high rake for intake and exhaust.

FIGS. 20A-I depict an inboard propeller.

FIGS. 21A-G depict a propeller with a through hub exhaust.

DETAILED DESCRIPTION OF THE INVENTION

Figure 1A:
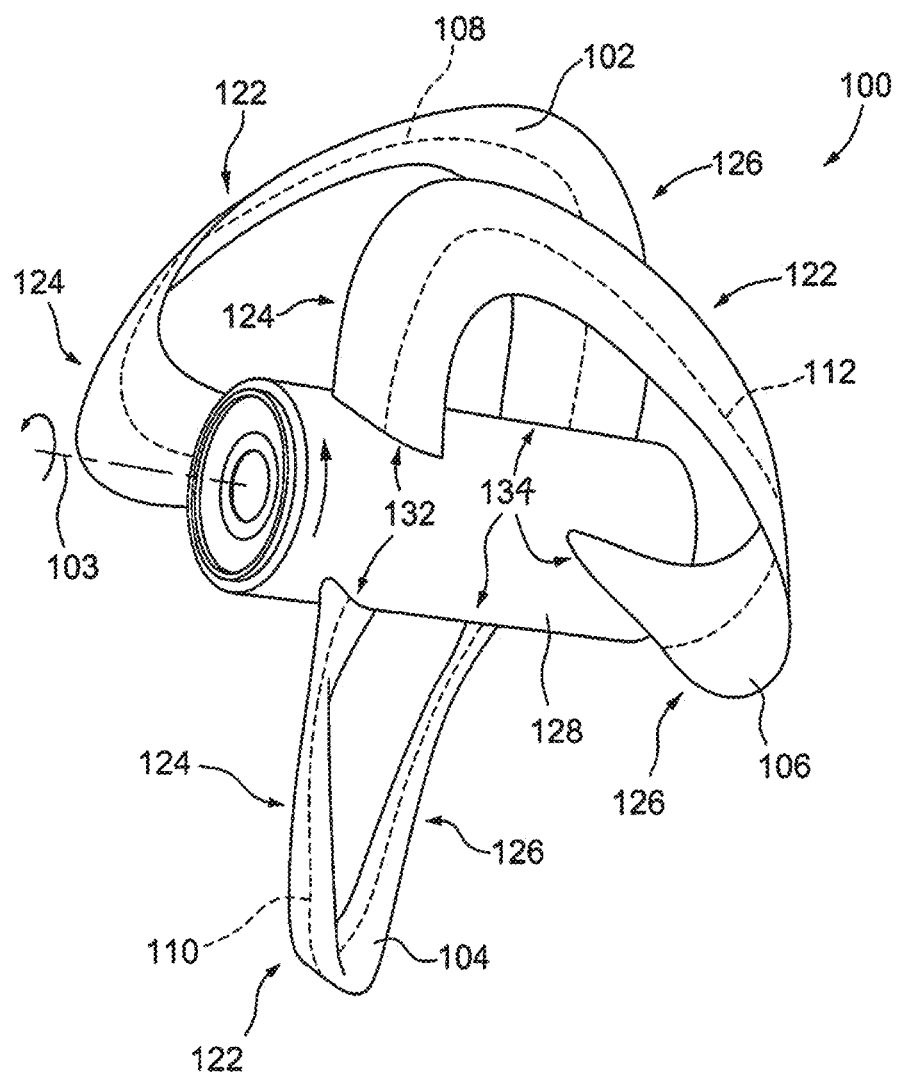
FIGS. 1A-E depict various views of an illustrative propeller.
Figure 1B:
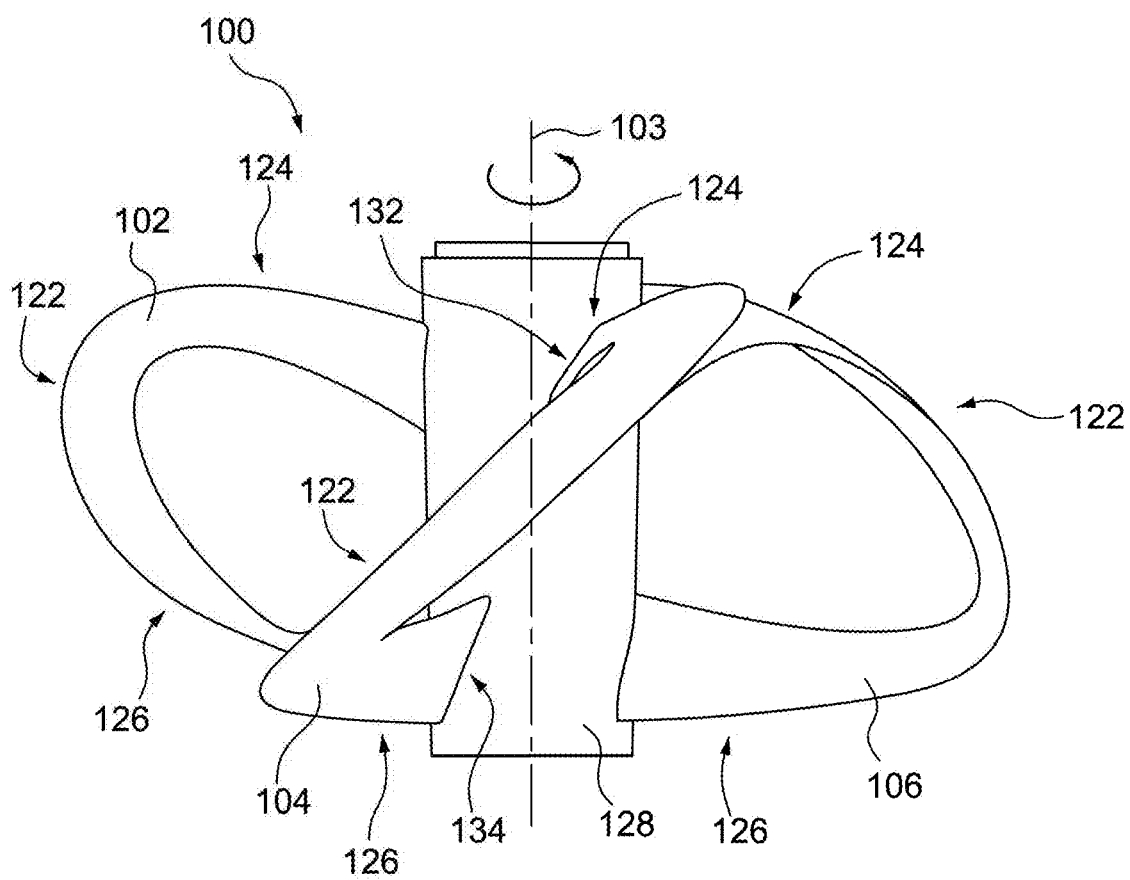
Figure 1C:
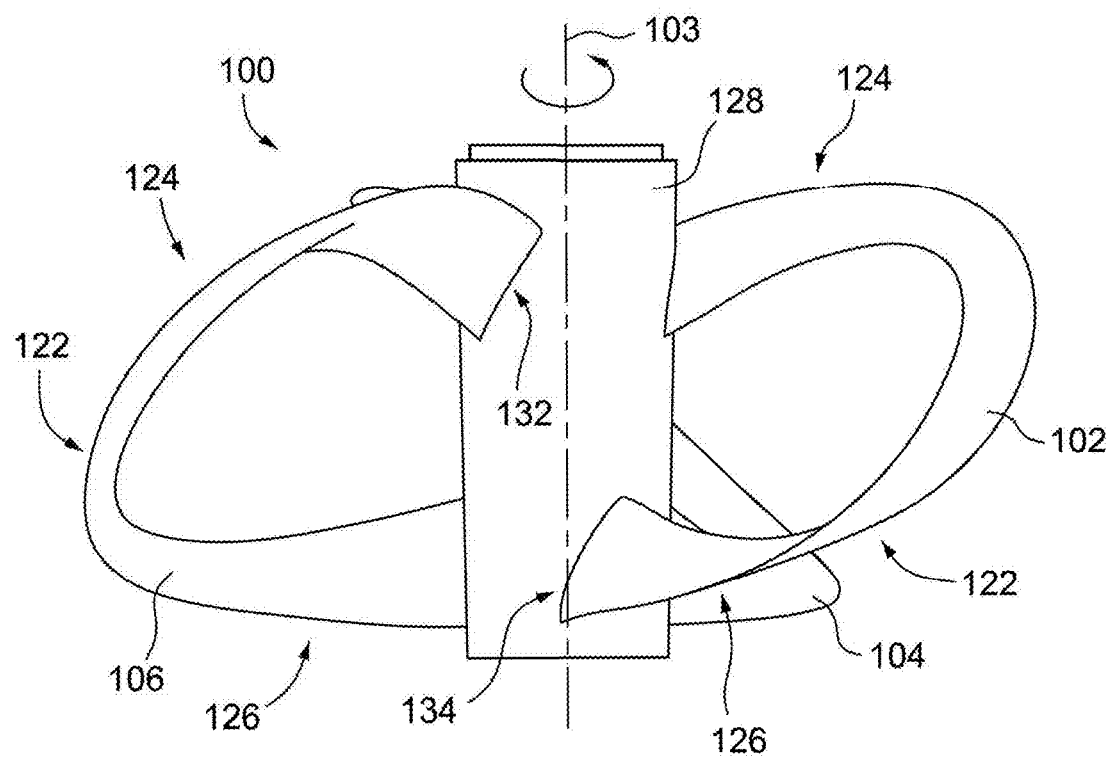
Figure 1D:
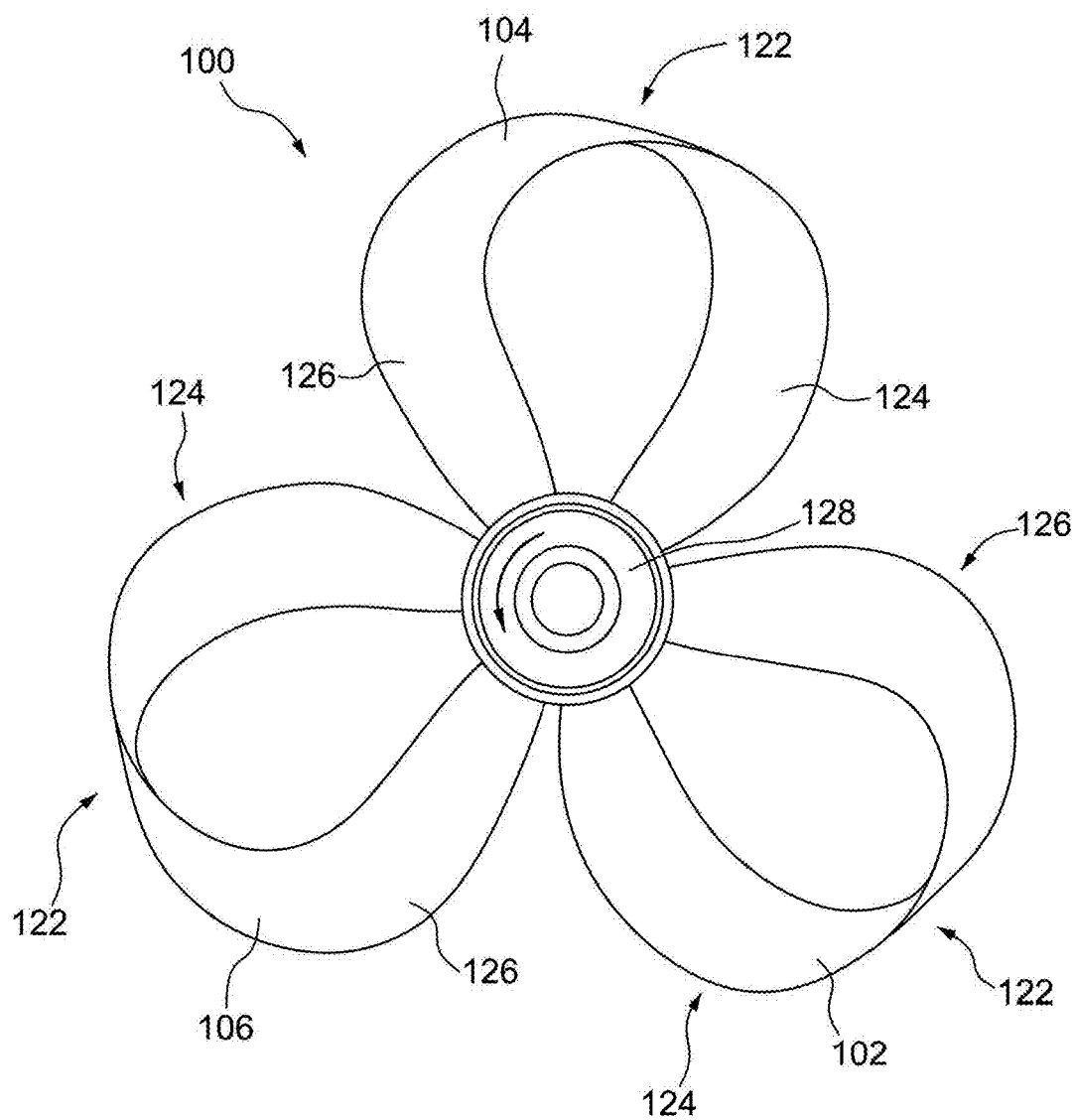
Figure 1E:
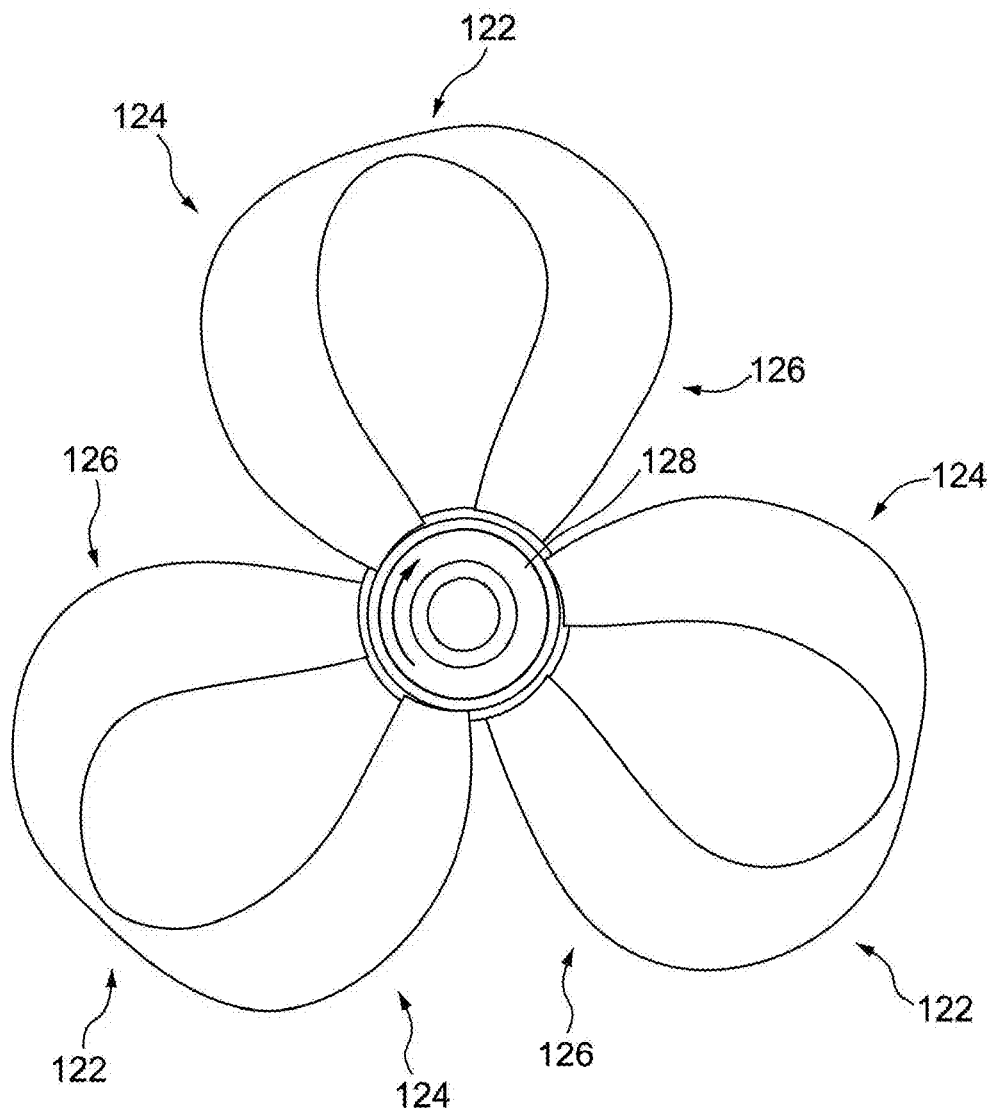

FIGS. 1A-E depict propeller 100 according to an illustrative embodiment. FIG. 1A depicts a perspective view of propeller 100. FIG. 1B depicts a side view of propeller 100, and FIG. 1C depicts the opposing side of propeller 100. FIGS. 1D and 1E depict a top (fore) view and bottom (aft) view, respectively, of Propeller 100. Propeller 100 includes a plurality of blades 102, 104, 106, each having, an tip portion 122, an intake portion 124 and an exhaust portion 126. In this illustrative embodiment, blades 102, 104 and 106 extend from a hub 128. Each of blades 102, 104, 106 has a median line 108, 110, 112, respectively. Blades 102, 104, 106 rotate about hub axis 103. For simplicity the term "hub" may be used to include any rotational axis, even if there is no physical hub.

The blades have a means for generating non-axial lift and non-axial fluid flow and a means for redirecting the non-axial fluid flow to axial fluid flow. In illustrative embodiments, the means for generating non-axial lift and non-axial fluid flow is the configuration of the tip portion of the blade, which will be described further below. In illustrative embodiments the means for redirecting the non-axial fluid flow to axial fluid flow is the configuration of the tip and intake portion, and may also include the exhaust portion, which will also be described in more detail below.

The term "propeller" as used herein may include rotary blade devices that can be used to displace fluid to propel an apparatus, or which are employed in a stationary device such as, for example, a cooling or other air circulating fan, which moves fluid such as air through or around it.

Propeller 100 has three blades 102, 104, 106 disposed at equal increments around hub 128. Disclosed embodiments of the propeller may have for example, two, three, four, five, six, seven or eight blades that rotate in the same plane. The number of blades will generally depend on the application of the propeller. For example, additional blades may be beneficial for increases in the weight of a boat or airplane in which the propeller is employed to increase the area of the blades, thereby reducing the blade loading.

Blades 102, 104, 106 may be configured to rotate about an axis corresponding to hub axis 103, but in an apparatus in which there is no hub, such as in a configuration in which the blades extend inward from a rotating support. The rotation of the support may be generated by an electromagnetic field. Hub 128 may also be hollow, and may have openings in its surface, such as in a centrifugal fan.

Figure 2:
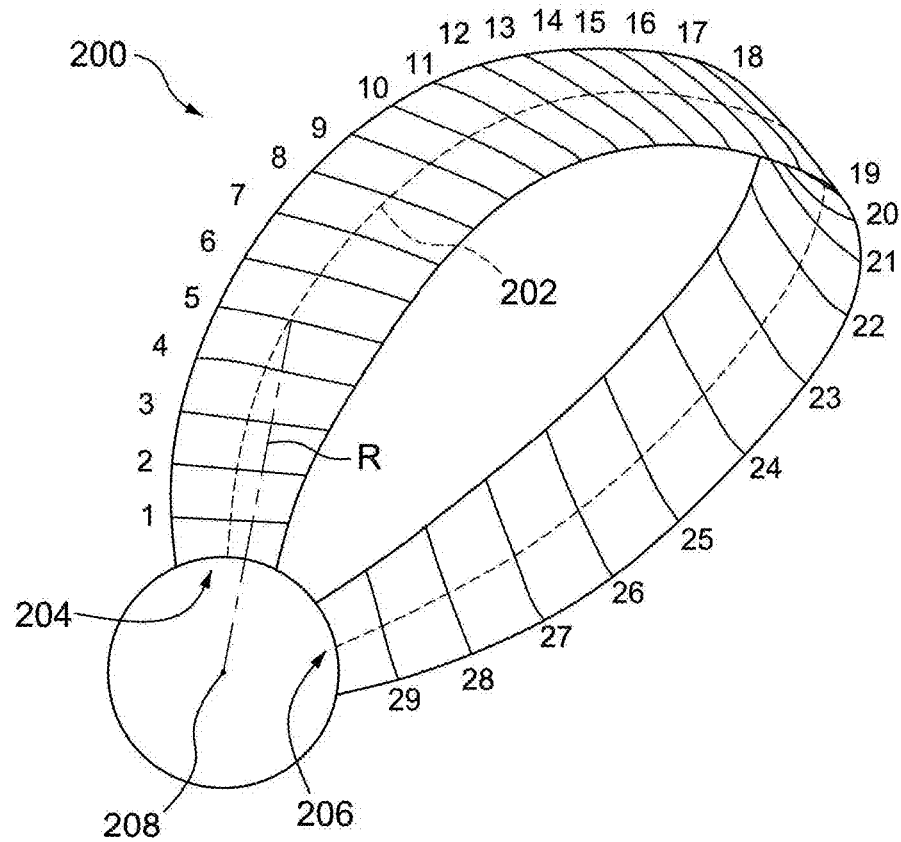
FIG. 2 depicts a parameter sections defining a propeller blade.

FIG. 2 depicts a blade 200 having parameter sections 1-29, with parameter section 1 in the vicinity of the intake root 204, and parameter section 29 in the vicinity of exhaust root 206. Each parameter section represents a set of physical properties or measurements whose values determine the characteristics of the blade area. The parameter sections as a group determine the shape of blade 200 and its behavior. Parameter sections are equally spaced in an exemplary embodiment but may be selected at unequal intervals. FIG. 2 serves merely to illustrate how blade parameter sections may be laid out to define the blade geometry. Parameter sections represent the shape and orientation of blade 200 at a particular place along the blade. A smooth transition is formed between parameter sections to create a blade. As used herein "orientation" may include location. In the illustrative embodiment in FIG. 2, blade sections 1-29 are planar sections disposed along an irregular helical median line 202. "Irregular helix" is used herein to mean varying from a mathematical helix-defining formula or as a spiral in 3-D space wherein the angle between the tangent line at any point on the spiral and the propeller axis is not constant. The blade may have an irregular, non-helical median line at least in part, or the median line may be an irregular helix throughout.

Although 29 blade sections are shown in FIG. 2, more or fewer sections can be used to define a blade. Additionally, sections may exist within or partially within the hub that are not shown or fully shown. Blades may be defined by planar or cylindrical parameter sections.

Parameter sections 1-29 are defined, for example, by orientation variables, such as roll angle and vertical angle (alpha), and may include location variables; and shape variables, such as chord length, thickness, and camber. Additional illustrative orientation or location variable include rake, skew angle and radius. Some or more of the variables may change through the blade or a blade portion and some may be constant throughout. Orientation variables may be measured with respect to an X-Y-Z coordinate system. The X-Y-Z coordinate system has the origin at the shaft centerline and a generating line normal to the shaft or hub axis 103. The X-Axis is along hub axis 103, positive downstream. The Y-Axis is up along the generating line and the Z-Axis is positive to port for a right-handed propeller. A left-handed propeller is created by switching the Z-Axis and making a left hand coordinate system.

Parameter sections may be located by their chord (nose-to-tail) midpoint, such as by using radius, rake and skew. Parameter sections may be oriented using the angles Phi, Psi and Alpha, as will be described further below.

Figure 3:
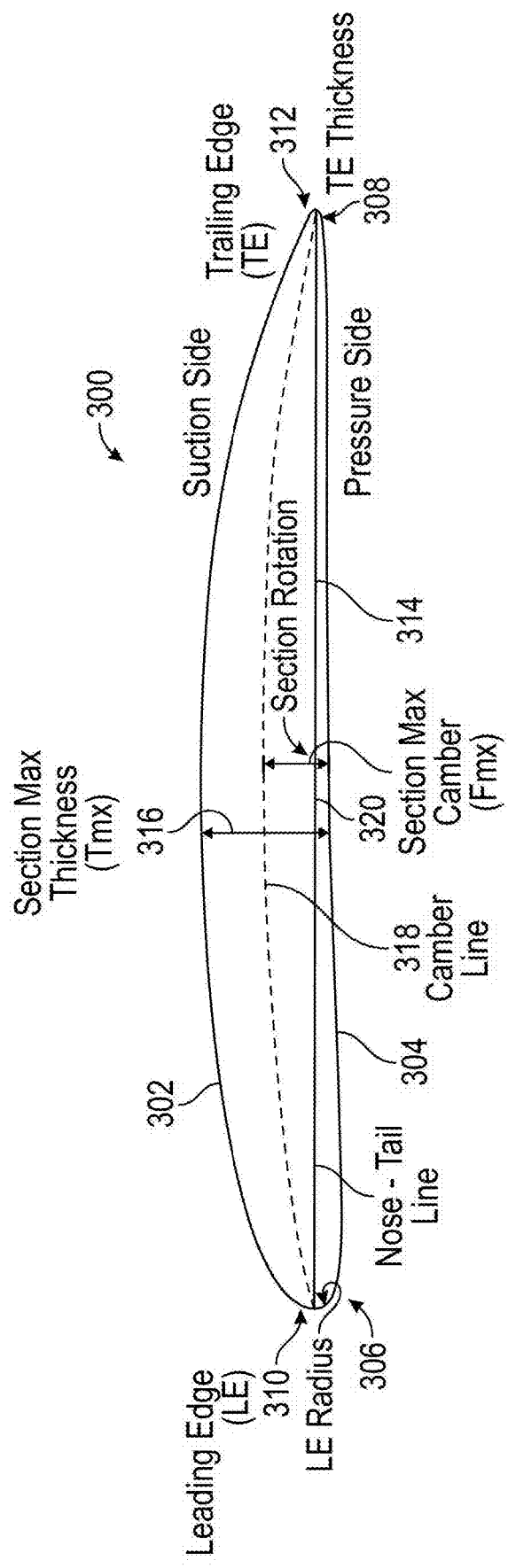
FIG. 3 depicts a blade parameter section geometry.

FIG. 3 depicts blade parameter section geometry by reference to a cross-sectional profile of a blade, which could be a parameter section. An illustrative parameter section 300 is in the form of an asymmetrical airfoil. The airfoil is bounded by a curved blade surface line 302 and a generally flat blade surface line 304, with a rounded nose 306 at the leading edge 310 of the parameter section and a pointed or less rounded tail 308 at the trailing edge 312 of parameter section 300. Parameter sections may also be in the shape of a symmetrical airfoil. Additional parameter section shapes include, for example, a shape having parallel blade surface lines 302, 304. Blade surface lines 302, 304 may also be linear and at an angle to one another. The nose and tail edges may both be rounded, both be flat (perpendicular to one or both blade surface lines 302, 304) or one of either the nose or tail may be rounded and the other of the two flat. A blade formed of a sheet material, for example, would generally exhibit parallel blade surface lines 302, 304. In an illustrative example of a blade formed of a sheet, the leading edge of the blade is rounded and the trailing edge is flat or less rounded, though both intake and trailing edges could be rounded.

Illustrative Shape Variables for Parameter Sections are Defined as Follows;

Radius: The term radius is used to define both the shape of a parameter section and its orientation with respect to the X-Y-Z coordinate system. With regard to the parameter section shape, radius may refer to the curvature of the nose 306 of parameter section 300, for example, and thus will be referred to as a "nose radius". Other points on parameter section 300 may be used to calculate a radius. By way of example, parameter section leading edge radius may be calculated based on maximum thickness 316 and the length of chord 314.

Chord: The chord is the nose-to-tail line 314 of the parameter section.

Thickness: Various thickness measurements may define a parameter section such as, for example, the maximum thickness 316. A further illustrative example is the trailing edge thickness, which may be calculated as a percentage of maximum thickness 316. For example, the trailing edge thickness may be 8% of maximum thickness 316 of parameter section 300.

Camber: Camber 318 defines the curvature of a parameter section.

Illustrative Orientation Variables Include:

Rake: Rake is the axial location of a parameter section chord midpoint.

By "axial location" it is meant in this instance, along the X-axis, which is coincident with the propeller rotational axis. Illustrative rake measurements are shown in FIGS. 4A-F for various parameter sections. Each of FIGS. 4A-F show coordinates X, Y and Z, wherein the X-axis is coincident with the propeller rotational axis, and the Y-axis and Z-axis are perpendicular to the X-axis, and the three axes are mutually perpendicular. Parameters are measured from the origin of the coordinate system. In an illustrative embodiment, the zero point of the coordinate system is along the propeller rotational axis, and is closer to the intake root than the exhaust root. Illustratively, values along the X-axis toward the intake root are negative and toward the exhaust root are positive. In general a coordinate system is located as desired and all parameters or geometry are measured from the origin of the selected coordinate system.

Figure 4A:
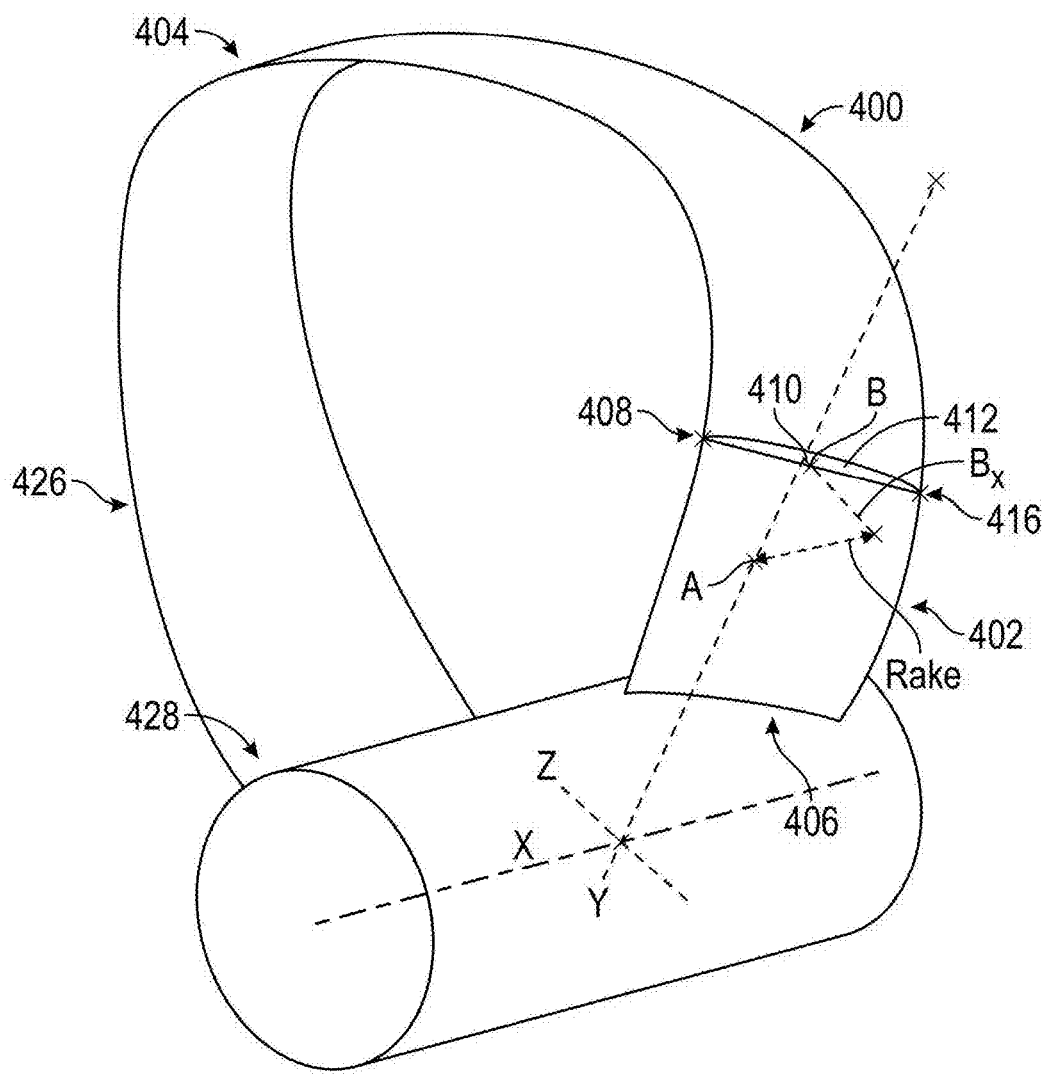
FIGS. 4A-F depict measurements of rake for parameter sections in the intake portion, tip portion and exhaust portion of a propeller blade.
Figure 4B:
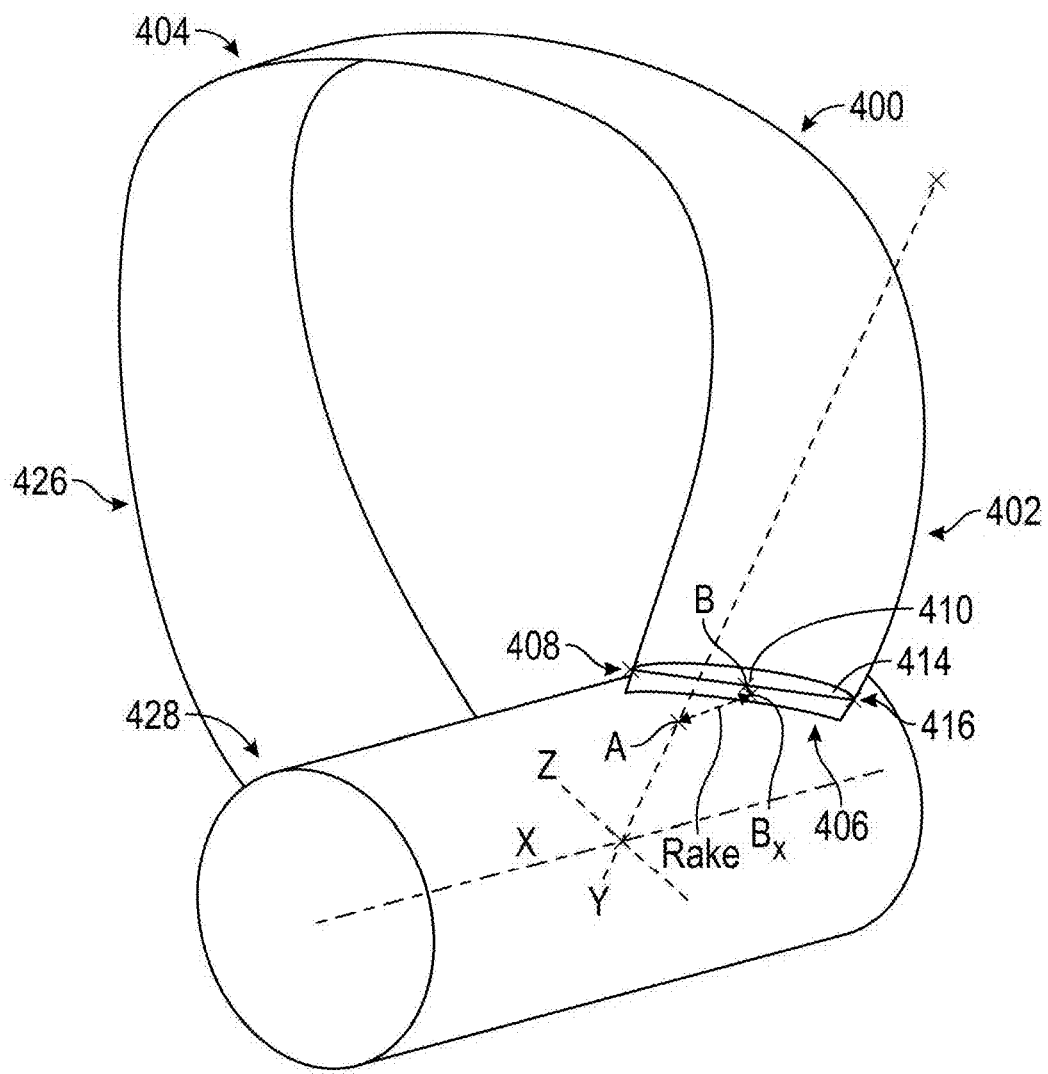

FIGS. 4A and 4B depict Rake for parameter sections 412, 414 on the intake portion 402 of blade 400. Parameter section 412 in FIG. 4A is toward tip portion 404 of blade 400. Parameter section 414 is toward intake root 406. Rake is measured along the propeller rotational axis or along a line parallel to the rotational axis. In the illustrative examples of FIGS. 4A, 4B, Rake is the distance from point A at X equals zero to the X coordinate value of point B, wherein point B is at the midpoint 410 of the chord of parameter sections 412, 414. The X-coordinate value of point B is represented by $B_x$ in FIGS. 4A-F. Chords of parameter sections shown in FIGS. 4A-F are defined by end points 408, 416.

Figure 4C:
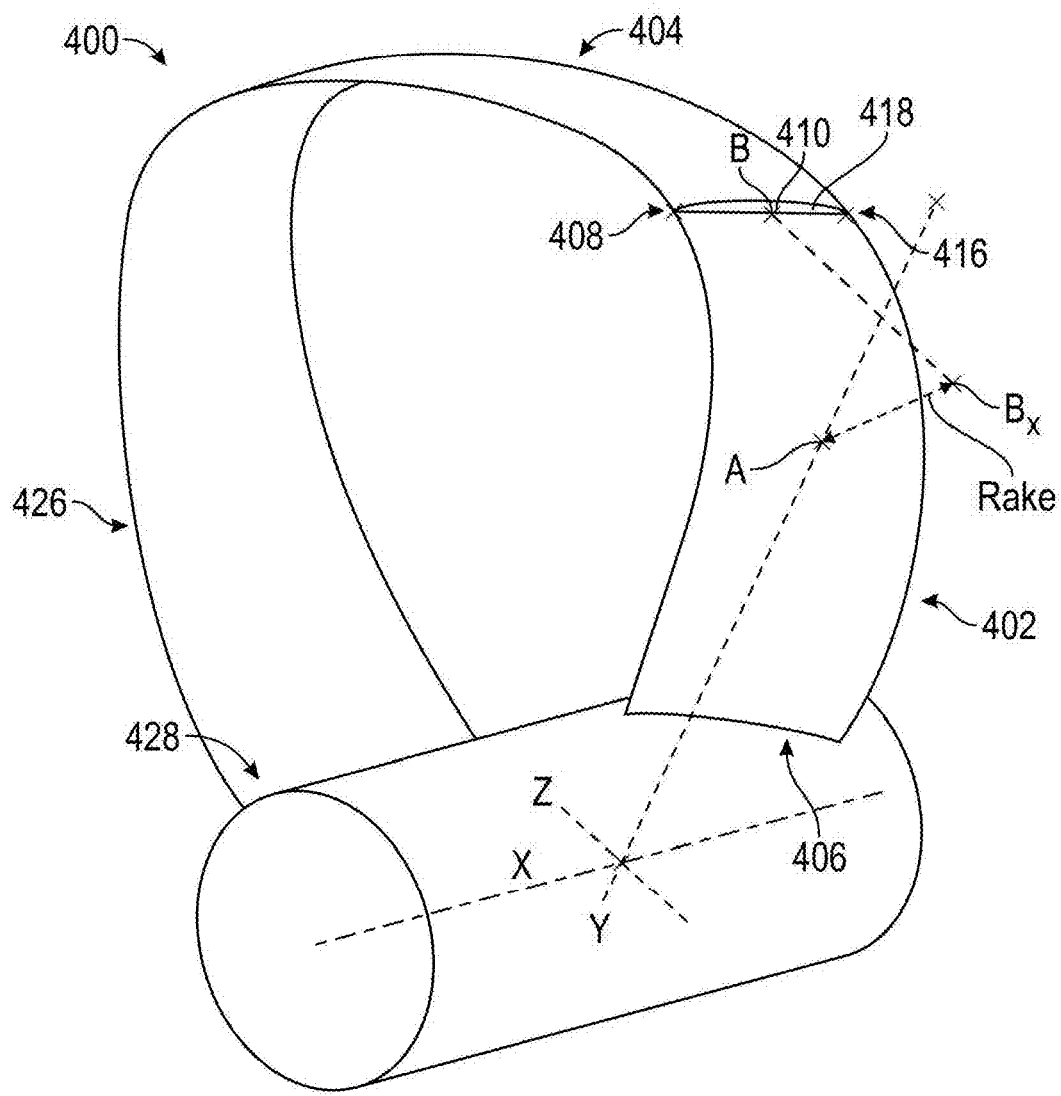
Figure 4D:
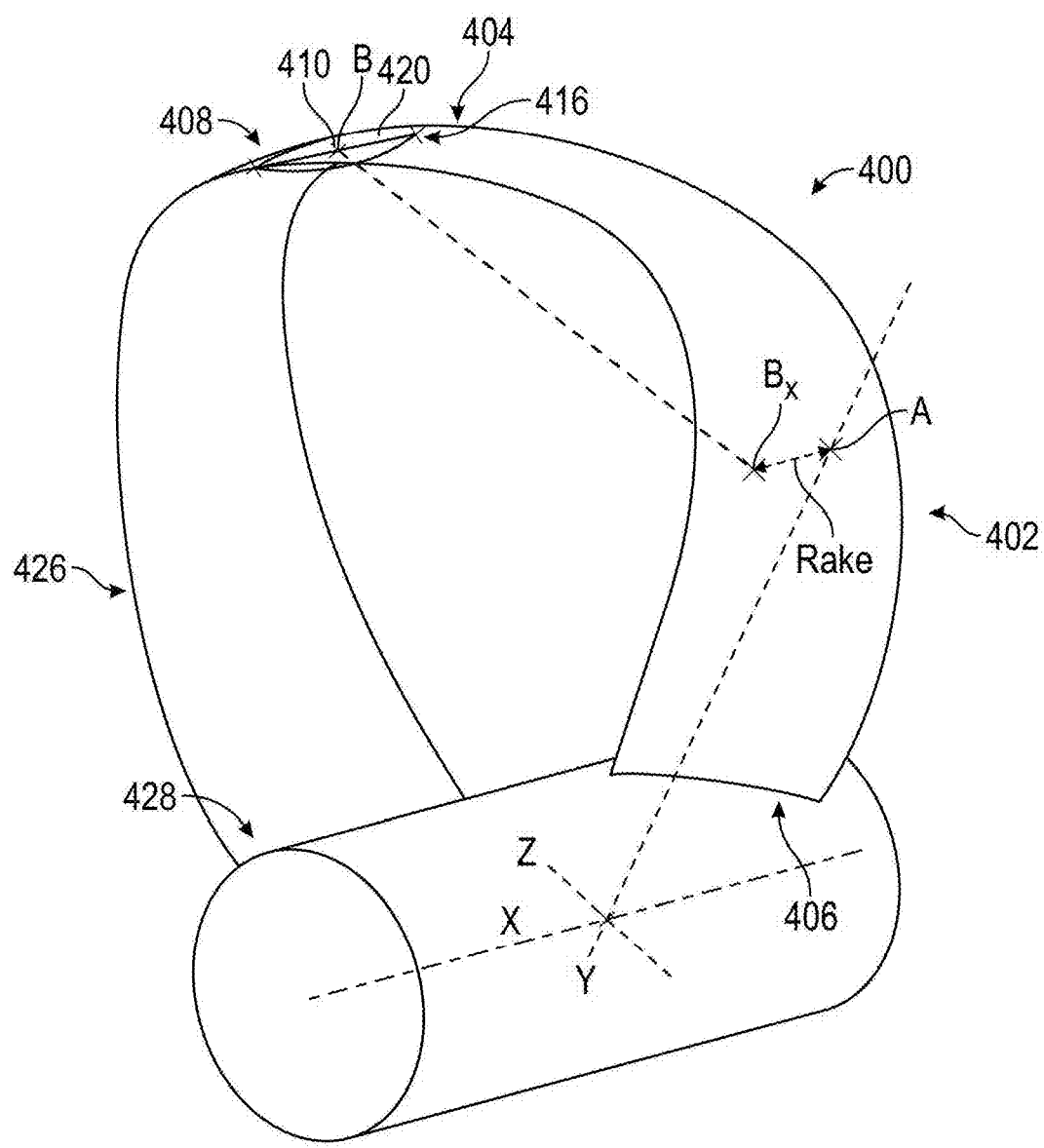
Figure 4E:
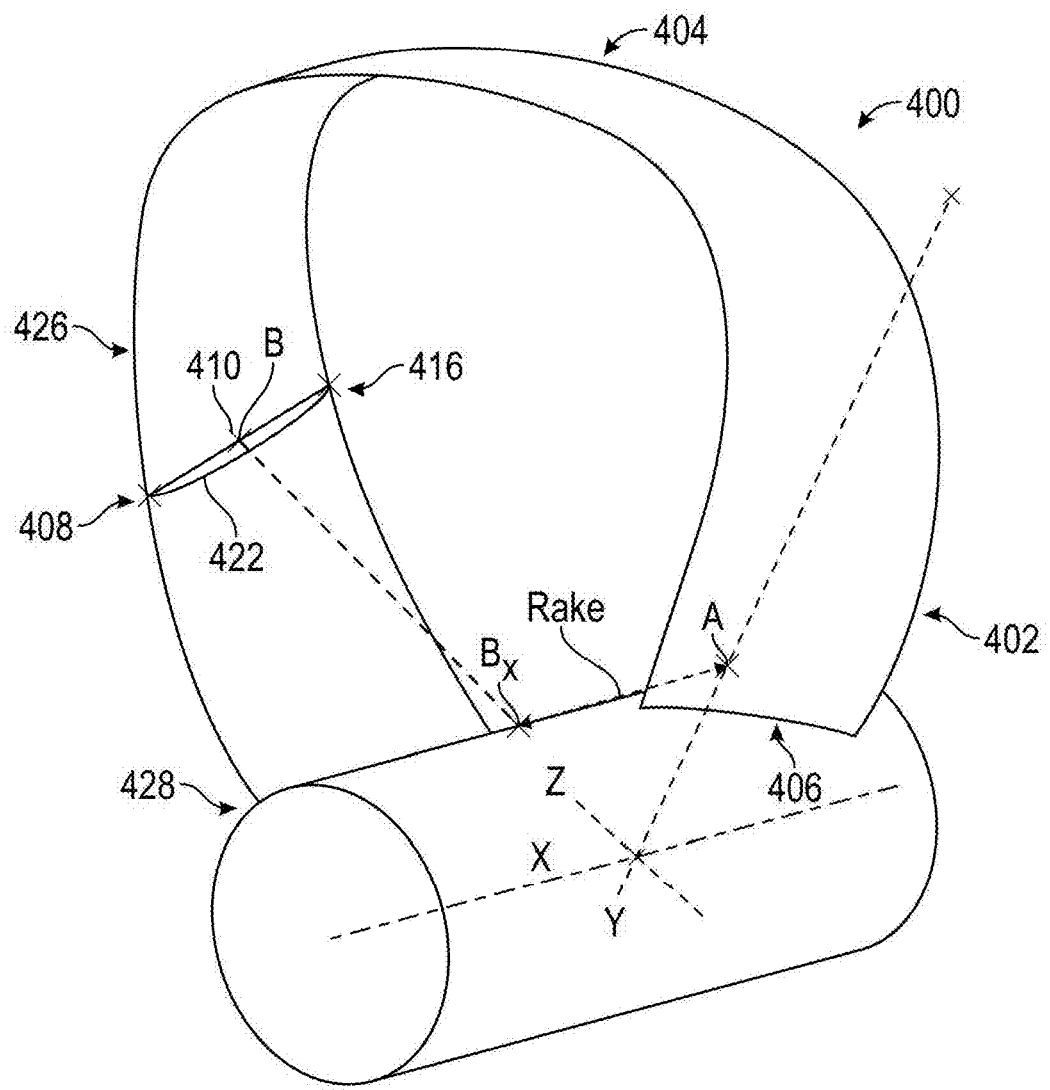
Figure 4F:
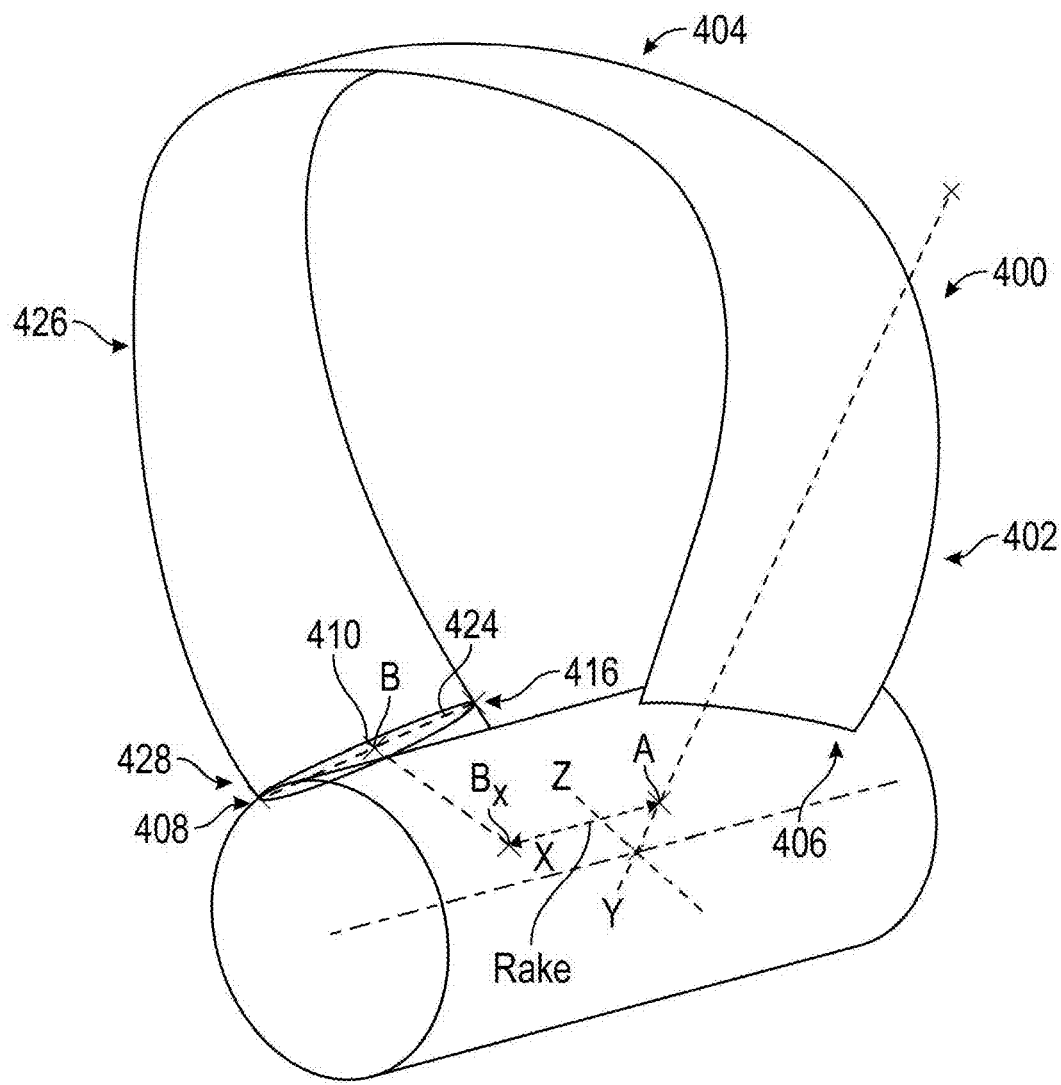

FIGS. 4C and 4D depict Rake for parameter sections 418, 420 on the tip portion 404 of blade 400. Parameter section 418 in FIG. 4C is at a first position in tip portion 404 of blade 400 wherein the roll value (described further below) is greater than zero and less than 90 degrees. Parameter section 420 in FIG. 4D is at a second position in tip portion 404 where the roll value is equal to or greater than 90 degrees. In the illustrative examples of FIGS. 4C, 4D, Rake is the distance from point A at X equals zero to the X coordinate value, $B_x$, of point B, wherein point B is at the midpoint 410 of the chord of parameter sections 418, 420. FIGS. 4E and 4F depict Rake for parameter sections 422, 424 on the exhaust portion 426 of blade 400. Parameter section 422 in FIG. 4E is toward tip portion 404 of blade 400. Parameter section 424 is toward exhaust root 428. In the illustrative examples of FIGS. 4E, 4F, Rake is the distance from point A at X equals zero to the X coordinate value of point B, wherein point B is at the midpoint 410 of the chord of parameter sections 422, 424.

Pitch Angle: Pitch Angle is the angle between the chord line of a parameter section and a plane perpendicular to the X-axis. Pitch angle may be calculated based on pitch distance and blade radius. Examples of pitch angle of parameter sections are provided in FIGS. 4A and 4C. FIGS. 4A and 4C show pitch angle for parameter sections 412 and 418, respectively.

Radius: The orientation radius is the distance from the hub center 208 to the midpoint 320 of chord 314 of a parameter section. Chord 314 may also be referred to as the nose-to-tail line. The radius described in this paragraph will be referred to as the parameter section orientation radius to differentiate it from the nose radius or other parameter section shape radii, which are not measured with respect to the X-Y-Z coordinate system. Midpoint 320 of chord 314 is the point on the parameter section chord line through which the median line 202 would pass. This is illustrated in FIG. 2 by line R which extends from hub center 208 to the midpoint of the chord of parameter section 5. Note that the chord of parameter section 5 and its midpoint are not specifically shown in FIG. 2.

Figure 5A:
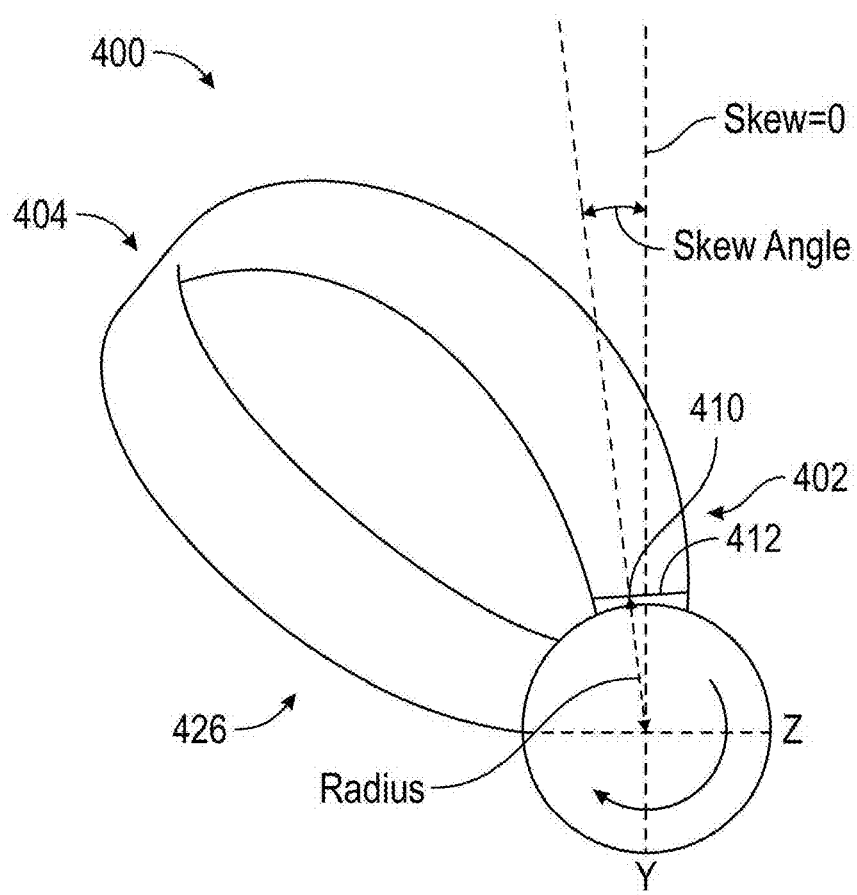
FIGS. 5A-F depict measurements for skew angle and vertical angle of parameter sections in the intake portion, tip portion and exhaust portion of a propeller blade.
Figure 5B:
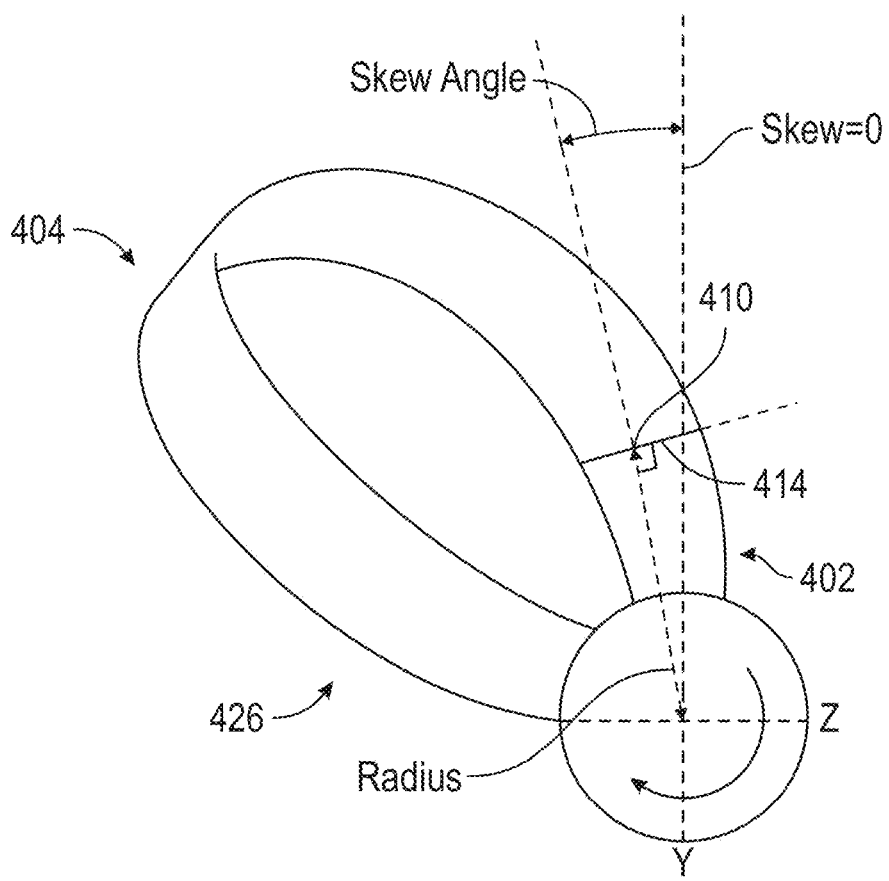
Figure 5C:
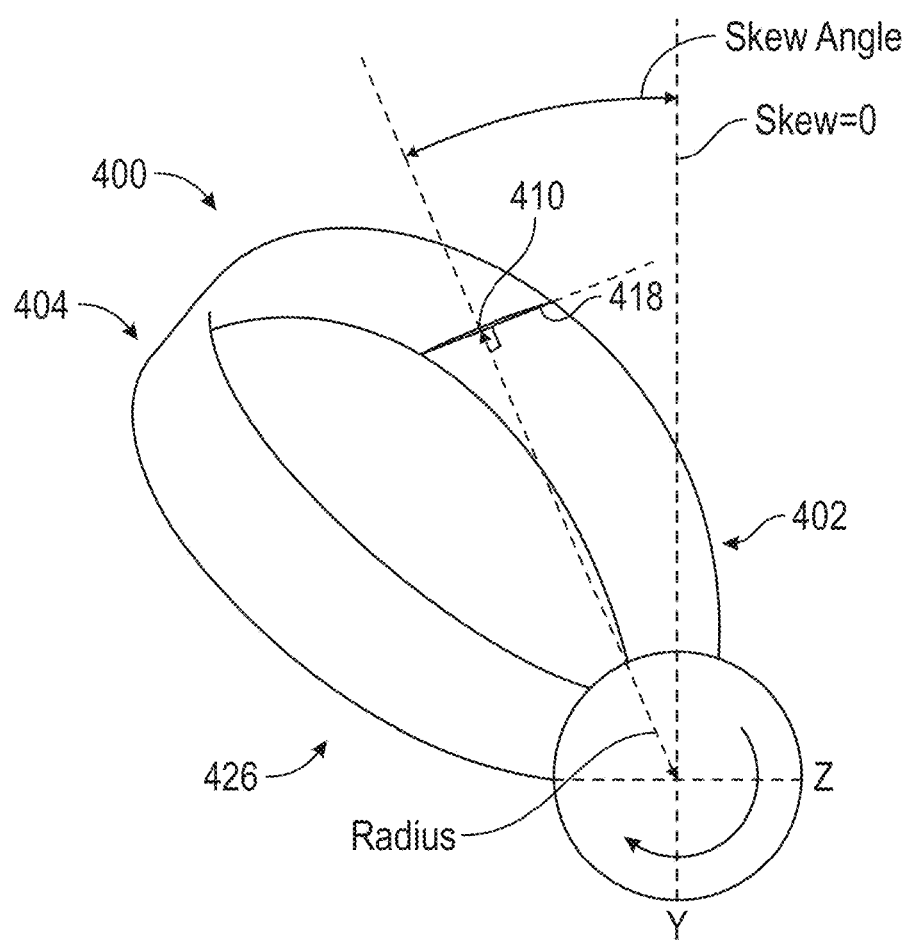
Figure 5D:
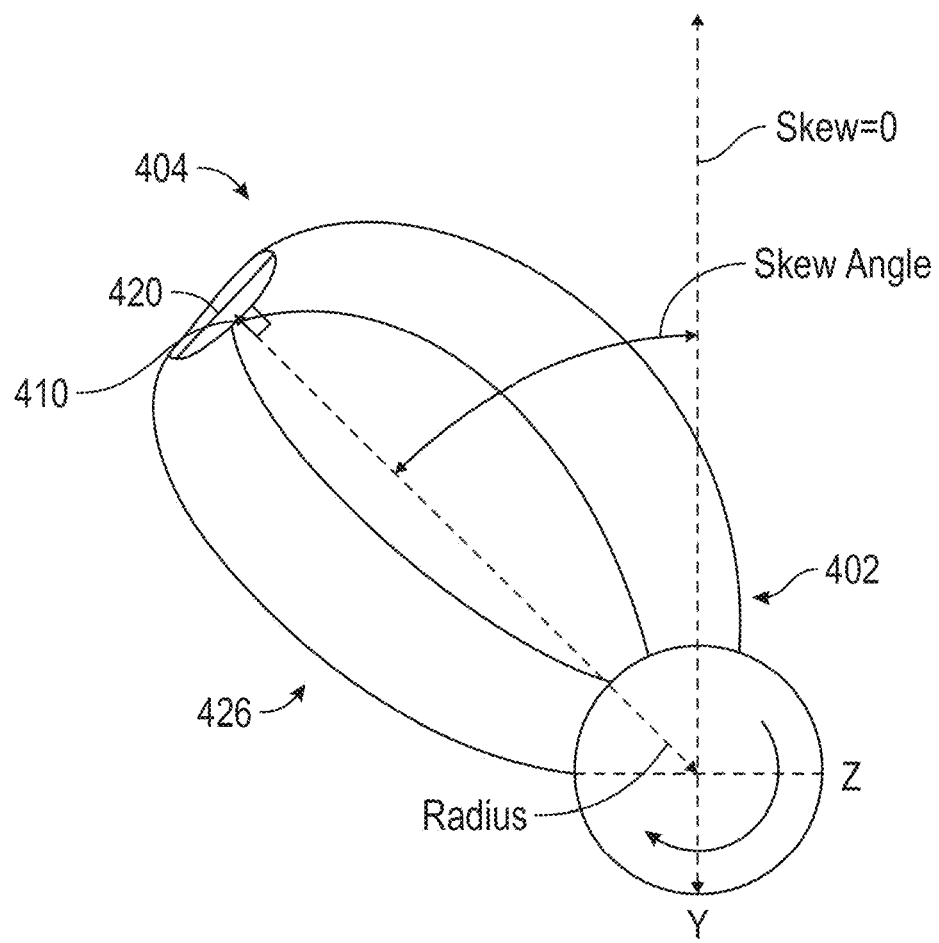
Figure 5E:
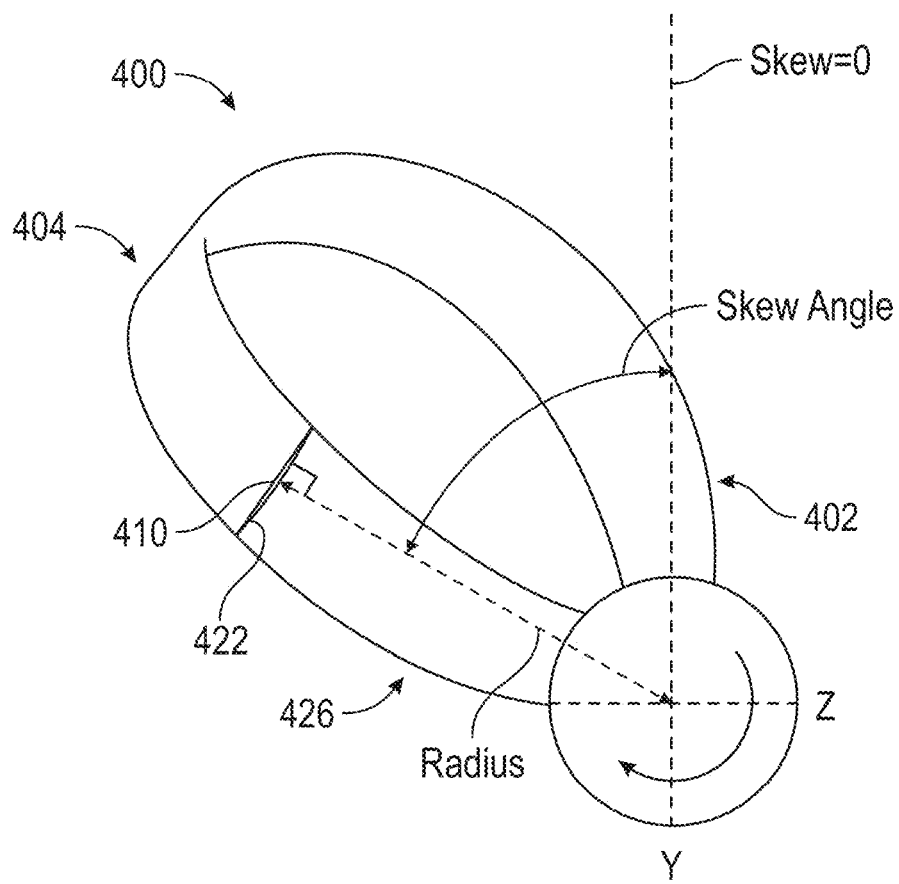
Figure 5F:
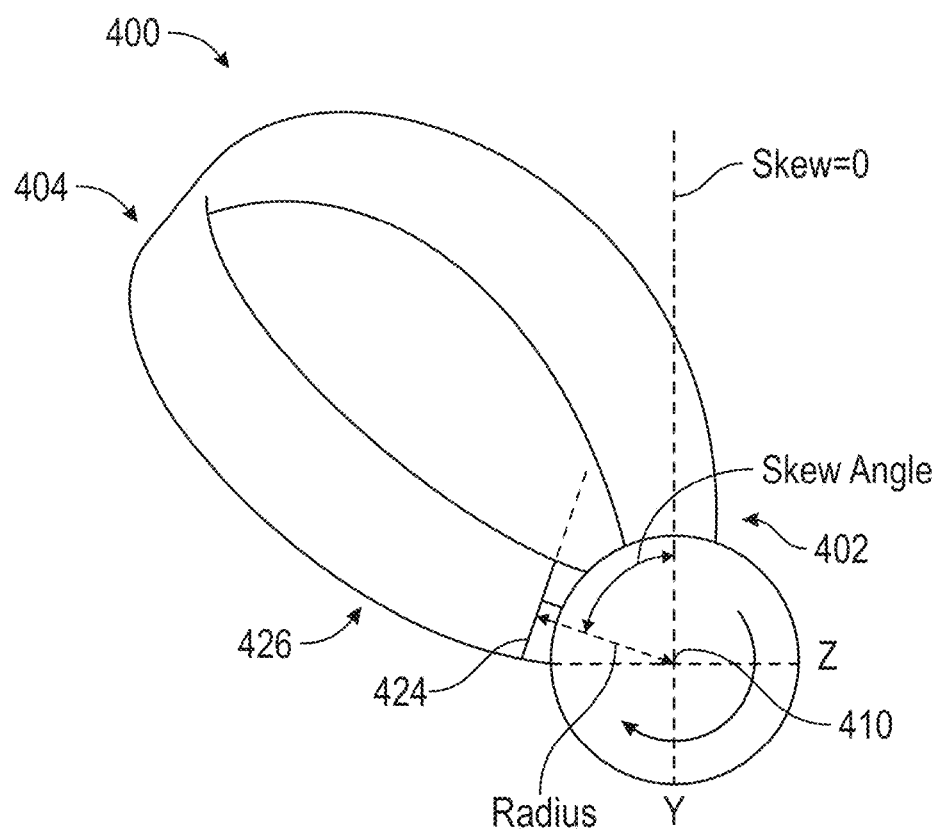

FIGS. 5A-F depict blade 400 viewed along the blade rotational axis X. FIGS. 5A-F identify representative parameter section radii and skew angle. FIG. 5A depicts the radius of parameter section 412 in the intake portion 402 of blade 400. FIG. 5B shows the radius of parameter section 414, a parameter section in intake portion 402 of blade 400 further from intake root 406 than parameter section 412. FIGS. 5C and 5D depict radii for parameter section 418 and 420, respectively, wherein parameter section 418, 420 are in tip portion 404. FIGS. 5E and 5F depict radii for exhaust parameter section 422 and 424, respectively, both within exhaust portion 426. The position of parameter sections 412, 414, 418, 420, 422 and 424 as being in intake portion 402, tip portion 404, or exhaust portion 426 are provided only for case of discussion. The actual parameter values and resulting fluid flow may define the positions of the sections otherwise.

FIGS. 5A-F further show skew angle of parameter sections 412, 414, 418, 420, 422, 424. Skew angle is the projected angle from a line through midpoint 410 of chord 314 to the generating line, in this illustrative embodiment the Y-axis looking along hub axis 103 (X-axis).

FIGS. 7A-D, in addition to depicting skew angle and radius, depict parameter section vertical angle, Alpha, labeled on each of FIGS. 7A-D. Vertical angle may also be referred to as "lift angle." Alpha is the angle that the parameter section is rotated relative to a line perpendicular to the skew line, which is identified in FIGS. 7A-D and described below. The aforementioned skew line refers to the line together with the zero skew line that forms the skew angle. Depending on the value of Alpha, the nose of the parameter section will either be "lifted" or will "droop" from a line perpendicular to the skew line that forms the skew angle with respect to the zero skew line, wherein the zero skew line is coincident with the Y-axis of the coordinate system identified on FIGS. 7A-D.

It is noted that FIGS. 5A-F do not identify Alpha, because Alpha equals zero. When Alpha is zero, the chord line of the parameter section is perpendicular to the zero skew line. This can be seen by a comparison of FIGS. 5A-F with FIGS. 7A-D.

Roll: Roll is the angle that a parameter section is rotated about its chord line. As described herein, a zero roll value is in a plane parallel to the hub axis. In an illustrative embodiment, roll at intake root 132 is zero, roll at exhaust root 134 is 180 degrees and a roll of 90 degrees is at a location within tip portion 122.

Various illustrative embodiments will be described by combinations of characteristics. The disclosed propeller includes different combinations of the characteristics, equivalents of the elements and may also include embodiments wherein not all characteristics are included.

In an illustrative embodiment of a propeller, the propeller includes a plurality of blades in a loop form, generally as shown in FIGS. 1A-E. The propeller in FIG. 1A is referred to only as a general reference to equate particulars with propeller regions. The actual form of the propeller blades will vary according to the parameters and within the ranges specified.

Each blade 102, 104, 106 of propeller 100 includes a tip portion 122, an intake portion 124 and an exhaust portion 126. In an illustrative embodiment, the intake portion is 0-45% of the blade, the tip portion is 30%-75% of the blade and the exhaust portion is 50 percent to 90 percent of the blade.

Propeller 100 may have various number of blades, each preferably with the same characteristics and parameters, although variations between blades is within the scope of the embodiments. An illustrative number of blades is between two and twelve, although more blades may be included in a single propeller. In particular embodiments, a propeller may have three, four, five, seven or eleven blades. In a propeller embodiment having looped blades, the blades have an intake root 132 at hub 128 and an exhaust root 134 at hub 128. Intake portion 124, tip portion 122 and exhaust portion 126 together may form a closed loop or the loop may be opened at the intake "root" or exhaust "root."

Roll: The roll angle (Psi) is the orientation angle about chord 314, for example. Referring back to FIGS. 1A-F, intake portion 124 extends from hub 128 generally outward for a propeller with a hub 128. Intake portion 124 may have a roll of zero at intake root 132. Intake portion 124 is configured to create axial lift only or more axial lift than non-axial lift. The roll value for all parameter sections in intake portion 124 may be zero. Illustrative roll value ranges for parameter sections in intake portion 124 include zero at intake root 132 progressing to between about 1 degree to 35 degrees where intake portion 124 transitions to tip portion 122. Additional ranges of roll value for intake portion 124 from intake root 132 to tip portion 122 include: from zero to between about 5 degrees to 25 degrees, and from zero to between about 10 degrees to 20 degrees.

Tip portion 122 may also be defined by a tip portion intake end that begins at the first deviation from zero of roll value and extends to a tip portion exhaust end that begins at a roll value of 90 degrees or just greater than 90 degrees.

Tip portion 122 is configured to generate non-axial lift only, more non-axial lift than axial lift, or more non-axial lift than intake portion 124. The roll value of parameter sections in tip portion 122 will transition from less than 90 degrees to greater than 90 degrees. Illustrative roll value ranges of tip portion 122 include between 1 degree and 46 degrees at the transition from intake portion 124 through between 91 and 150 degrees where tip portion transitions to exhaust portion 126. Additional illustrative roll value ranges of tip portion 122 include beginning at the transition from intake portion 124, between 5 degrees and 25 degrees and transitioning to a roll of between 110-135 degrees.

In an illustrative embodiment the transition from intake portion 124 to tip portion 122 occurs when the amount of non-axial lift produced by a given parameter section is greater than the axial lift. In a particular embodiment of the invention this transition takes place when roll is 45 degrees, or when roll is in a range of 40 degrees to 50 degrees.

Exhaust portion 126 is configured to generate less non-axial lift than tip portion 122. In an illustrative embodiment of the invention, the blade is configured so the average non-axial lift is the greatest in tip portion 122 as compared to either intake portion 124 or exhaust portion 126. In an illustrative embodiment the blade is configured so the average non-axial lift, if any, is greater in exhaust portion 126 than in intake portion 124. Illustrative roll value ranges of exhaust portion 126 include between 91 degrees and 150 degrees at the transition from tip portion 122 to exhaust portion 126 through 180 degrees at exhaust root 134. Additional illustrative ranges include beginning at the transition from tip portion 122, between 91 degrees and 135 degrees and transitioning to a roll of 180 degrees at exhaust root 134.

Figure 8A:
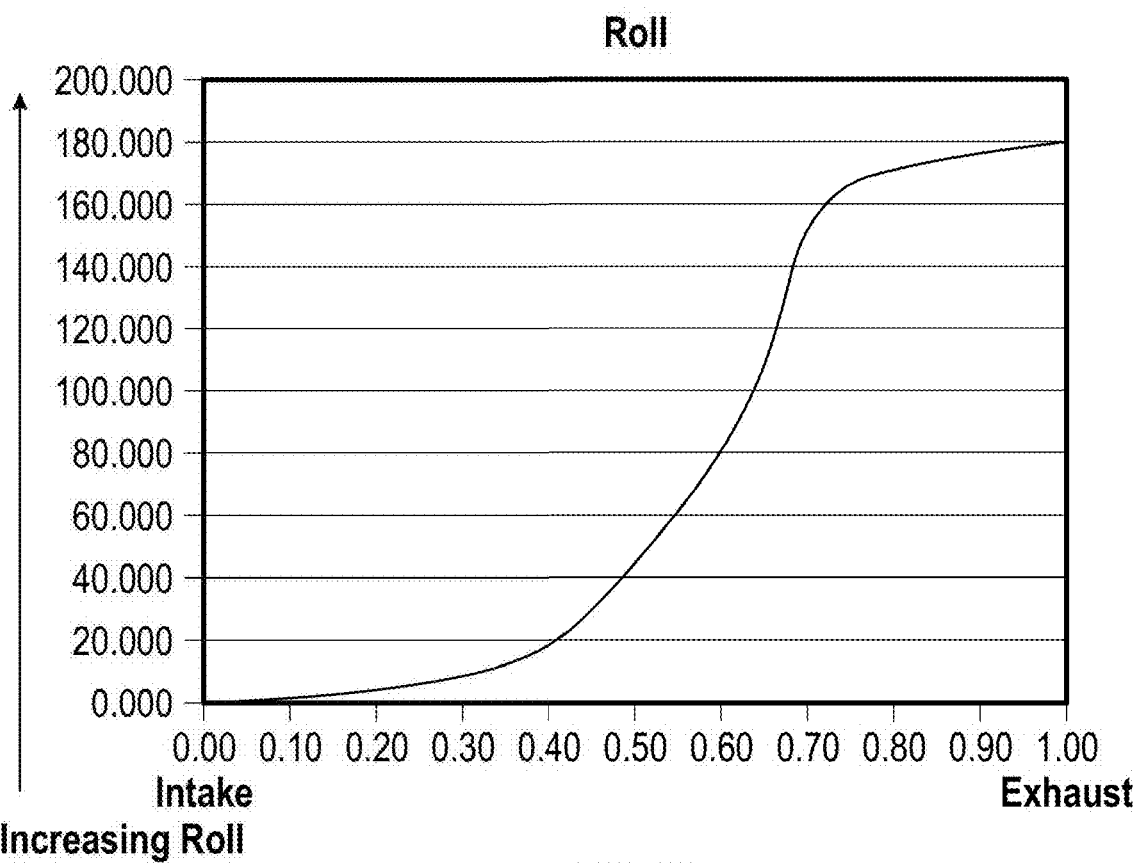
FIGS. 8A-H depict illustrative values or relative values of various parameters that define a parameter section or a blade.

FIGS. 8A-H depict illustrative values or relative values of various parameters that define a parameter section or a blade. FIG. 8A depicts illustrative roll values from an intake root of a blade to exhaust root. In an illustrative embodiment, beginning at intake root 132 through exhaust root 134, parameter section roll transitions from about zero to 5 degrees over the first 25 percent of the blade, from about 5 degrees to about 162 degrees over the next 50 percent of the blade, and from about 165 degrees to about 180 degrees over the last 25 percent of the blade.

In an illustrative embodiment non-axial lift is created by 10 percent to 90 percent of the blade. Further illustrative ranges include 10 percent to 75 percent and 25 percent to 50 percent.

Figure 6:
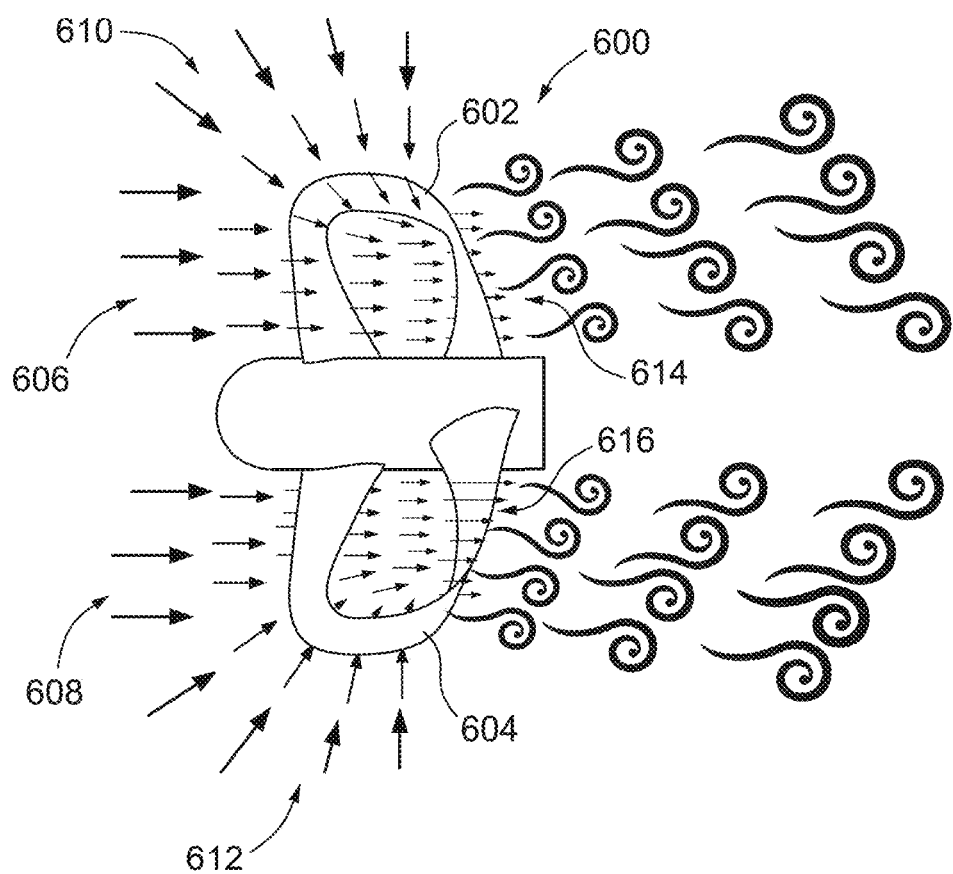
FIG. 6 depicts an example fluid flow around propeller blades.

FIG. 6 depicts an illustrative example of a propeller 600 showing fluid flow around blades 602, 604. Intake portions 606, 608 show fluid flow in an axial direction at the intake portions 606, 608 of blades 602, 604, respectively. Fluid flow remains axial as the propeller moves forward or fluid moves through blades 602, 604. Fluid flow is still axial as it departs from the exhaust portions 614, 616 of blades 602, 604, respectively.

Within the tip portion of blades 602, 604 axial thrust is generated from the non-axial lift. Non-axial lift results in a fluid flow into the propeller blade, such as within the interior of the loop. Fluid encounters the leading edge of tip portions 610, 612 non-axially. As fluid is pulled in by the tip portions 610, 612 it is redirected into toward an axial direction within the loops of blades 602, 604. The non-axial lift may cause drag, which is created by the tip portion. As fluid passes the trailing edge of blades 602, 604, in tip portions 610, 612 it is in an axial direction or more toward an axial direction than when it entered the interior of the loops of blades 602, 604.

In an illustrative embodiment, propeller 600 is configured to create mixture of the free stream and jet stream of fluid flow aft of the propeller, wherein the mixing area is greater than the diameter of the propeller, wherein the propeller diameter in this instance is the measurement of the largest span of the propeller through the hub axis.

Referring back to FIGS. 1A-F, tip portions 122, intake portions 124 and exhaust portions 126 do not necessarily extend equal distances, such as along median lines 108, 110, 112. In an illustrative embodiment, intake portions 124 encompass a shorter distance than exhaust portions 126. Therefore, the distance along median line 108, 110, 112 wherein the blade is configured to redirect axial lift to non-axial lift extends a greater distance from exhaust root 134 than from intake root 132. In an illustrative embodiment, intake portion 124 extends a distance in a range of 10 percent to 50 percent of the median line length, exhaust portion 126 extends a distance in a range of 10 percent to 60 percent of the median line length; and tip portion 122 extends a distance of 5 percent to 60 percent of the median line length.

Figure 8B:
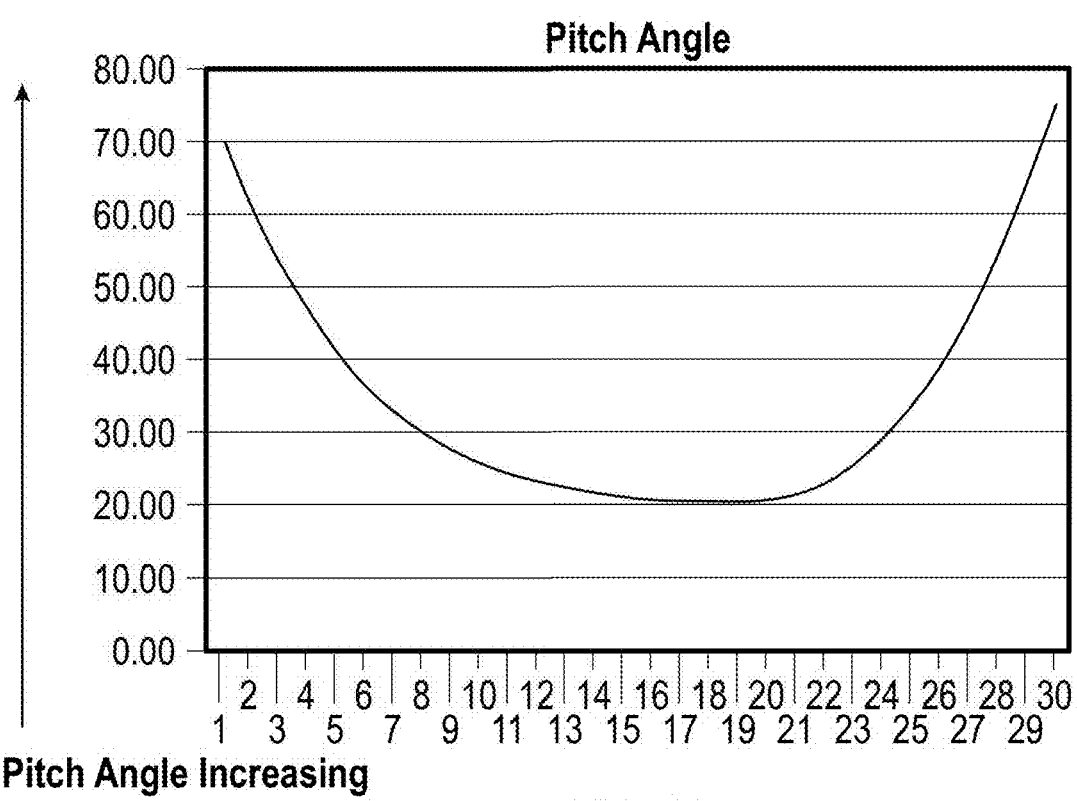

FIG. 8B depicts illustrative relative pitch angle values from an intake root of a blade to exhaust root. In an illustrative embodiment, beginning at intake root 132 through exhaust root 134, parameter section pitch angle transitions from about 70 degrees to about 35 degrees, over the next 50 percent of the blade pitch angle transitions from about 35 degrees to about 25 degrees, and over the last 25 percent of the blade, pitch angle transitions from about 25 degrees to about 75 degrees. In an illustrative embodiment of the invention, tip portion 122 has a non-zero pitch angle throughout. In an exemplary embodiment of the invention tip portion 122 is defined as and is configured to have non-zero pitch and redirect non-axial lift to create axial thrust.

Figure 8C:
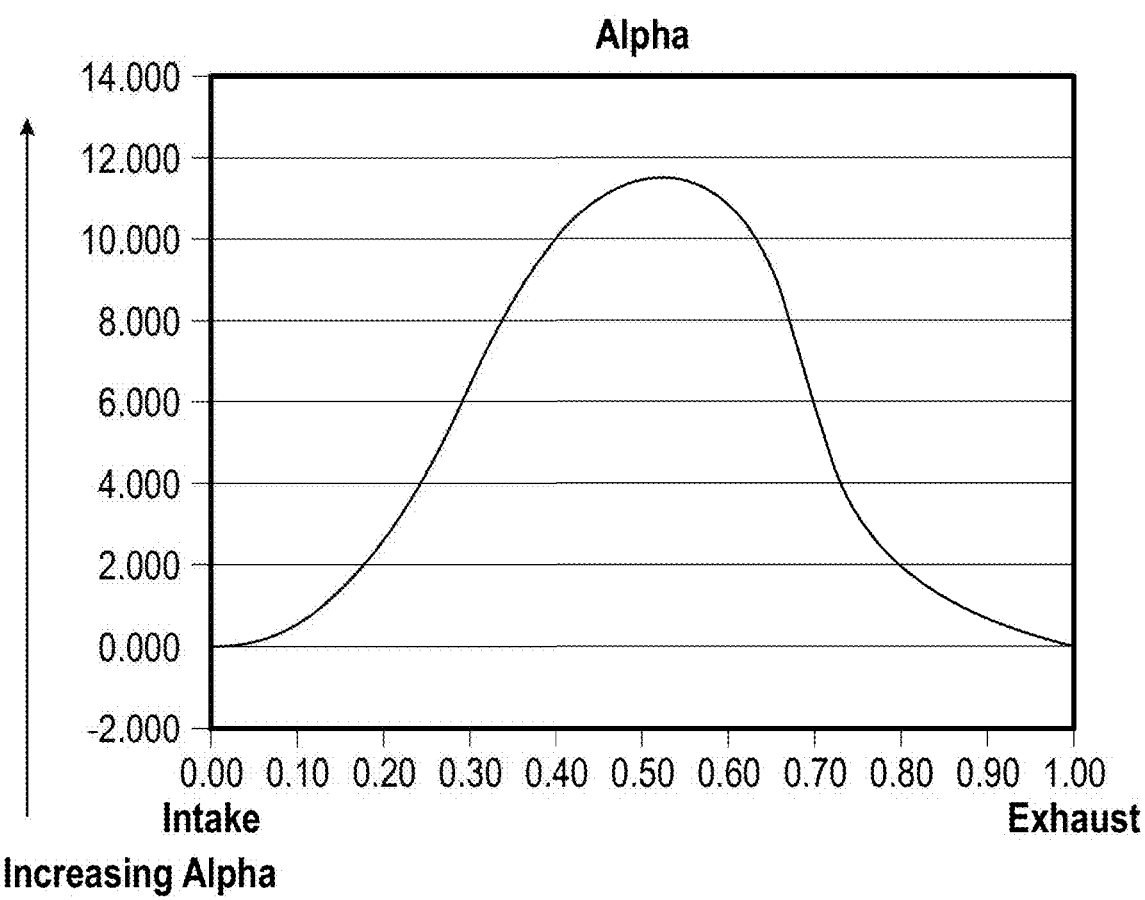

FIG. 8C depicts the vertical angle, Alpha, from an intake root of a blade to exhaust root according to an illustrative embodiment. The vertical angle orients parameter sections away from being perpendicular to skew. In an illustrative embodiment the vertical angle is zero for all parameter sections. In a further embodiment the vertical angle for the intake and tip portions is positive for all parameter sections and the vertical angle for the exhaust portion is negative for all parameter sections. In yet a further embodiment tip portion 122 may have at least one parameter section with a non-zero vertical angle. In other embodiments, the average vertical angle for the tip and intake portions is greater than the average vertical angle of the exhaust portion.

In an illustrative embodiment the average vertical angle for parameter sections in exhaust portion 126 is greater than the average vertical angle for parameter sections in intake portion 124.

Illustrative ranges of the vertical angle of tip portion 122 includes, 0 to 1 degree, 1 degree to 10 degrees; 4 degrees to six degrees; zero to 5 degrees; 1 degree to 4 degrees; and 2 degrees to 3 degrees. The vertical angle may also be zero throughout the entire blade. The vertical angle at the tip may cause fluid to be drawn in to the interior of the blade "loop" and may thereby cause drag. The vertical angle at the tip may also create fluid flow that is off-axis from the direction of travel which is redirected to axial fluid flow within the loop. The greater the vertical angle in the tip region, the greater the amount of non-axial lift and as a result the greater the amount of non-axial fluid flow into the propeller. The vertical angle of parameter sections in tip portion 122 may create non-axial lift and drag in the vicinity. In illustrative embodiments, the vertical angle is between −45 degrees and 45 degrees throughout the blade; between −25 degrees and 25 degrees or between −15 degrees and 15 degrees throughout the blade.

Figure 8D:
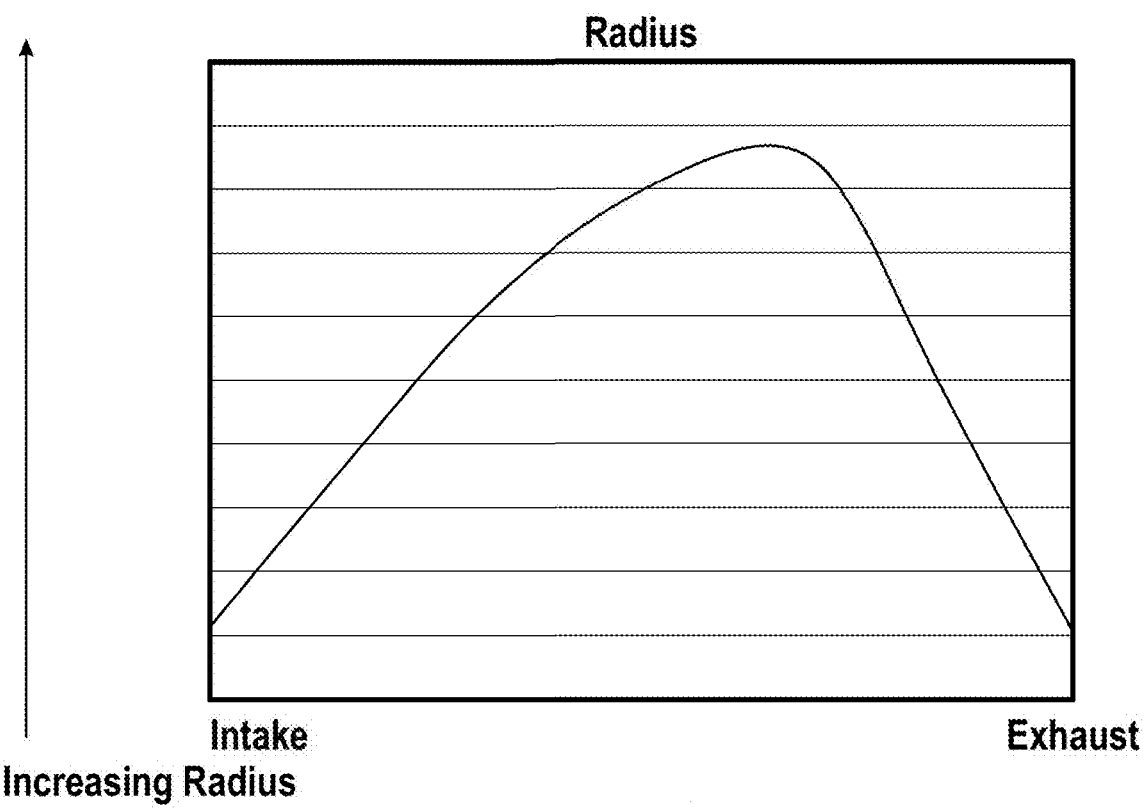

FIG. 8D depicts illustrative relative radius values from an intake root of a blade to exhaust root. In an illustrative embodiment the radius of parameter sections increases throughout the first 60 percent to 80 percent of the blade beginning at intake root 132 and then decreases through parameter sections through to exhaust root 134. As used in this paragraph and elsewhere, parameters transitions over parameter sections correspond to transitions through the blade.

Figure 8E:
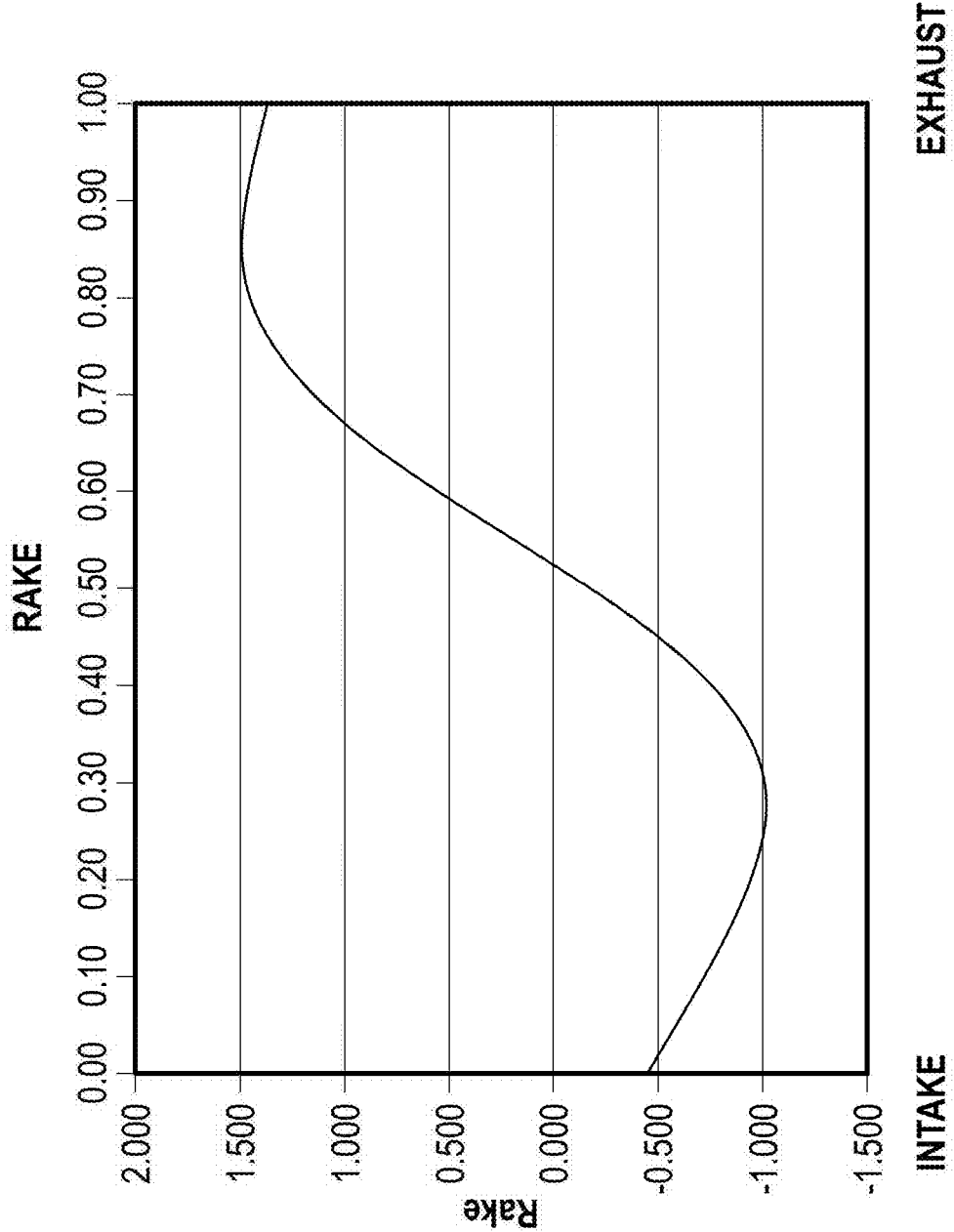

FIG. 8E depicts illustrative rake values from an intake root of a blade to exhaust root. Rake in an exemplary embodiment may be increasingly negative from intake root 132 through the first 30 percent to 40 percent of the blade. Rake may then increase for the next 10 percent to 15 percent of the blade until it reaches positive values. Rake may then continue to increase for an additional 20 percent to 40 percent of the blade and then level off for the remainder of the blade or decrease. Rake may also be linear from the intake root of position of zero to a positive exhaust root value.

Figure 8F:
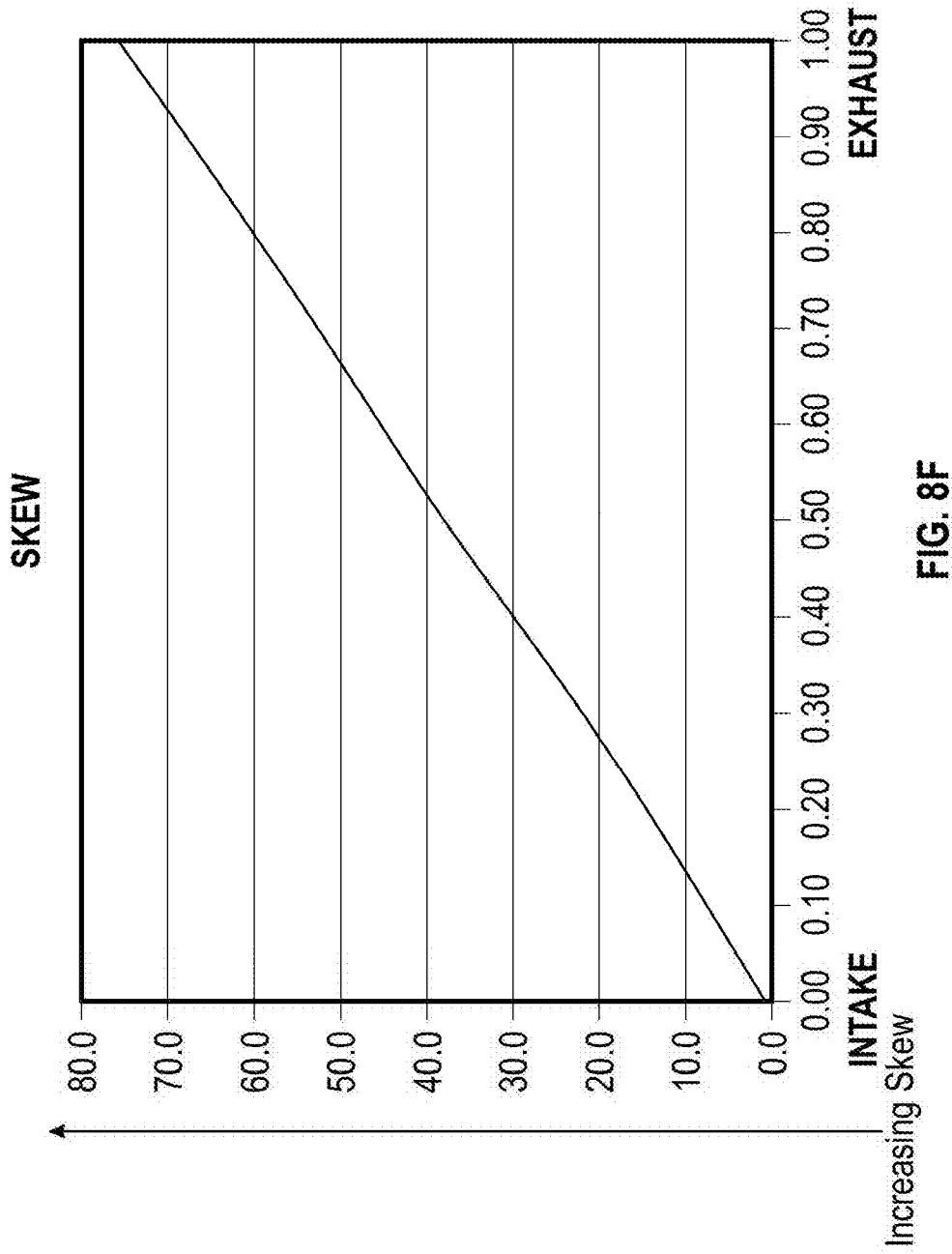

FIG. 8F depicts illustrative relative skew values from an intake root of a blade to exhaust root. In an illustrative embodiment the skew value continually increases from intake root 132 through exhaust root 134. In another illustrative embodiment the skew value may continually decrease so the exhaust portion is forward of the intake and tip portion on its rotational plane. Parameter section chord 314 may be normal to the skew line throughout the blade or in a portion of the blade, wherein the skew line to which chord 314 is perpendicular is the skew line that forms the skew angle with the zero skew line.

Figure 8G:
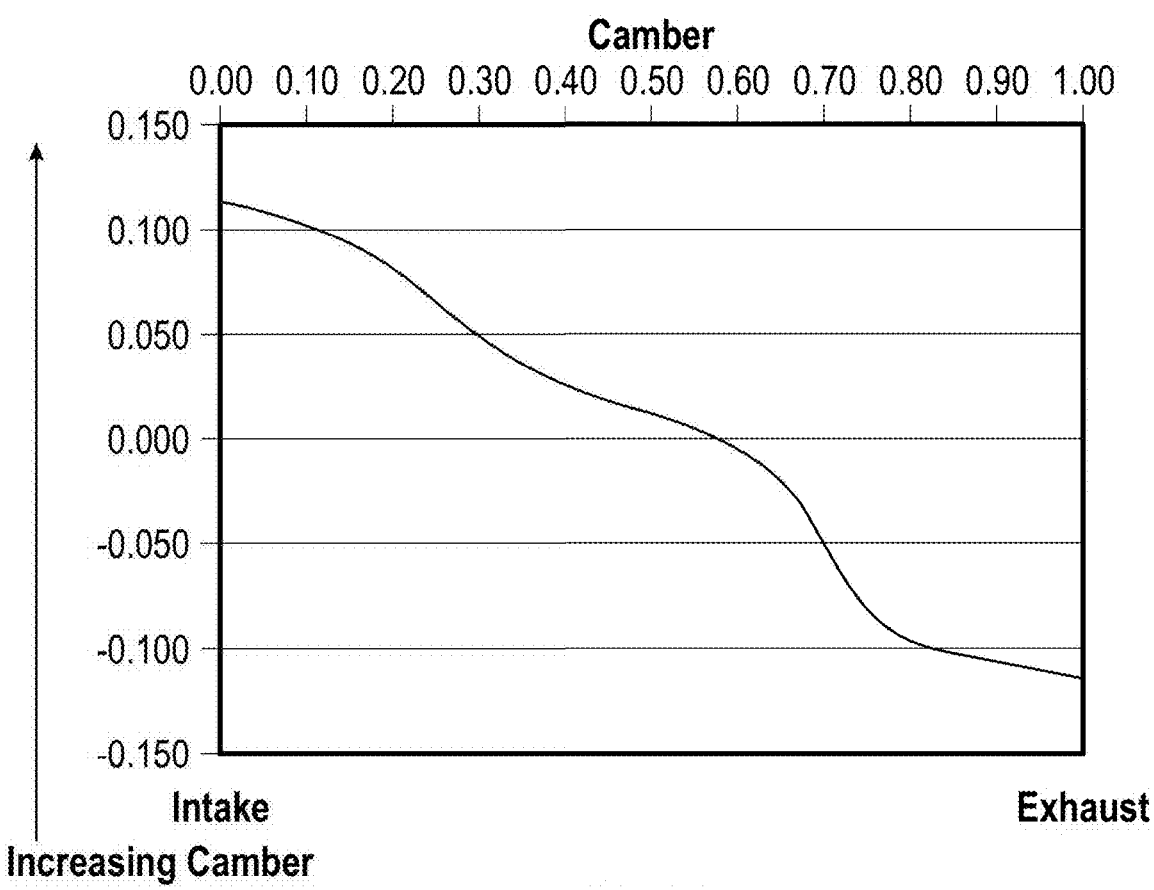

FIG. 8G depicts illustrative relative camber values from an intake root of a blade to exhaust root. In an illustrative embodiment the camber of parameter sections transitions from a positive value at the intake root 132 to a negative value at the exhaust root 134, wherein the suction side of the blade changes to the pressure side of the blade near the transition from the tip portion to the exhaust portion at the interface of positive camber to negative camber.

Figure 8H:
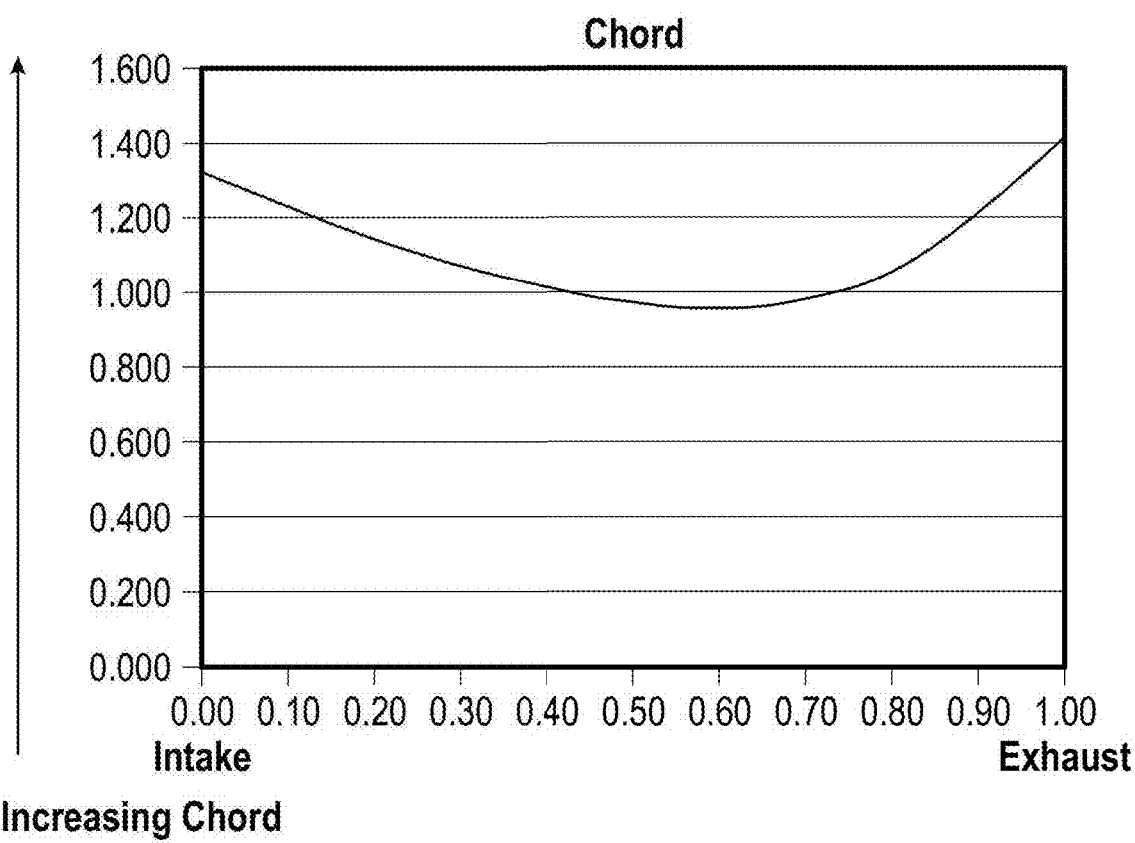
Figure 9A:
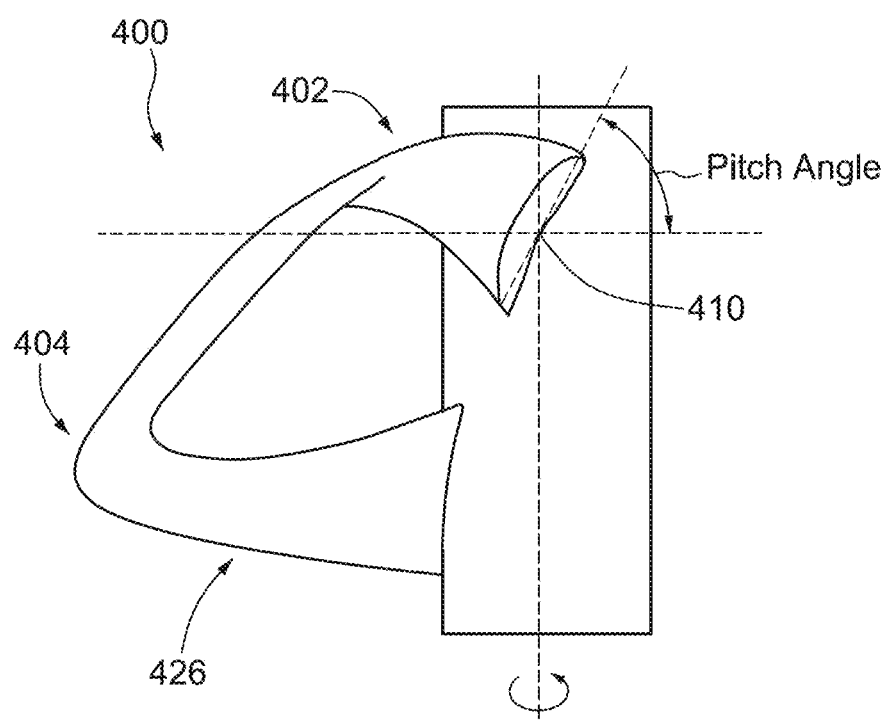
FIGS. 9A-F depict pitch angles for selected parameter sections of the blades.
Figure 9B:
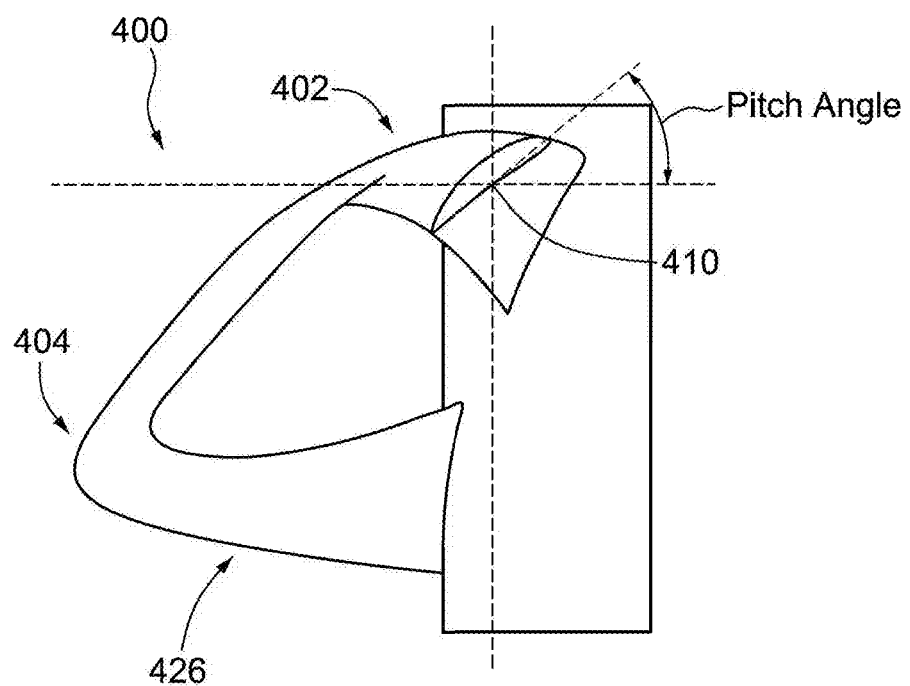
Figure 9C:
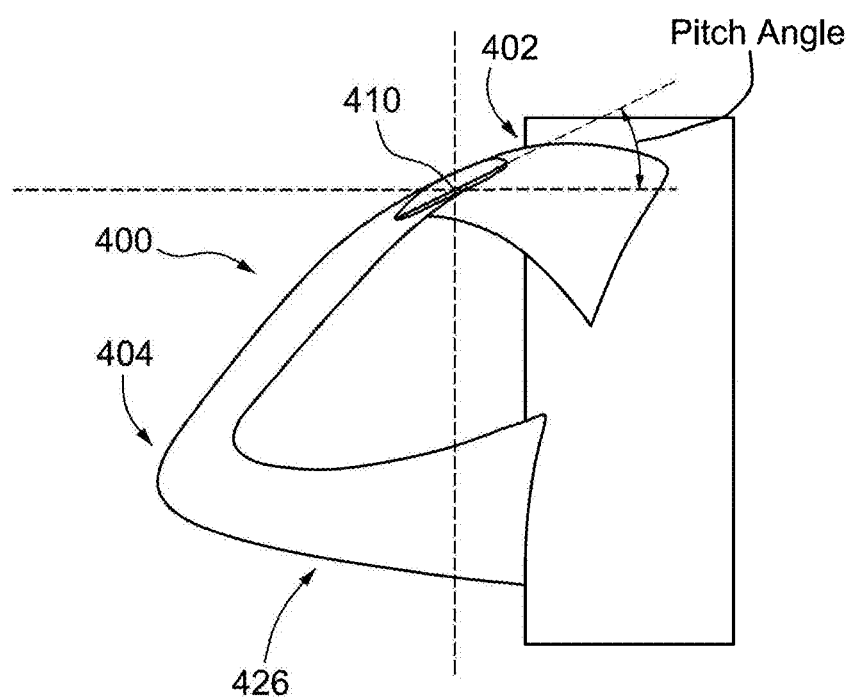
Figure 9D:
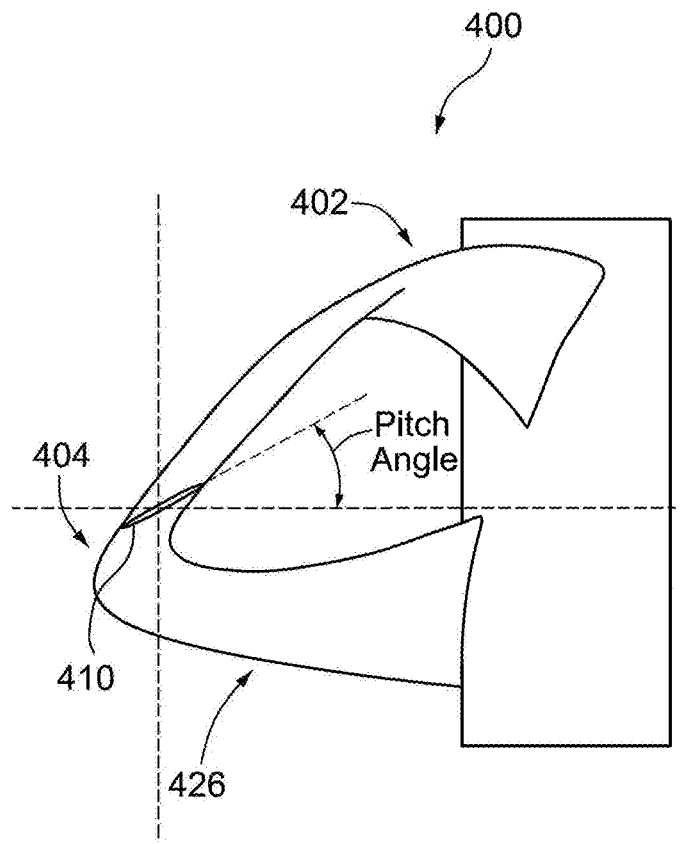
Figure 9E:
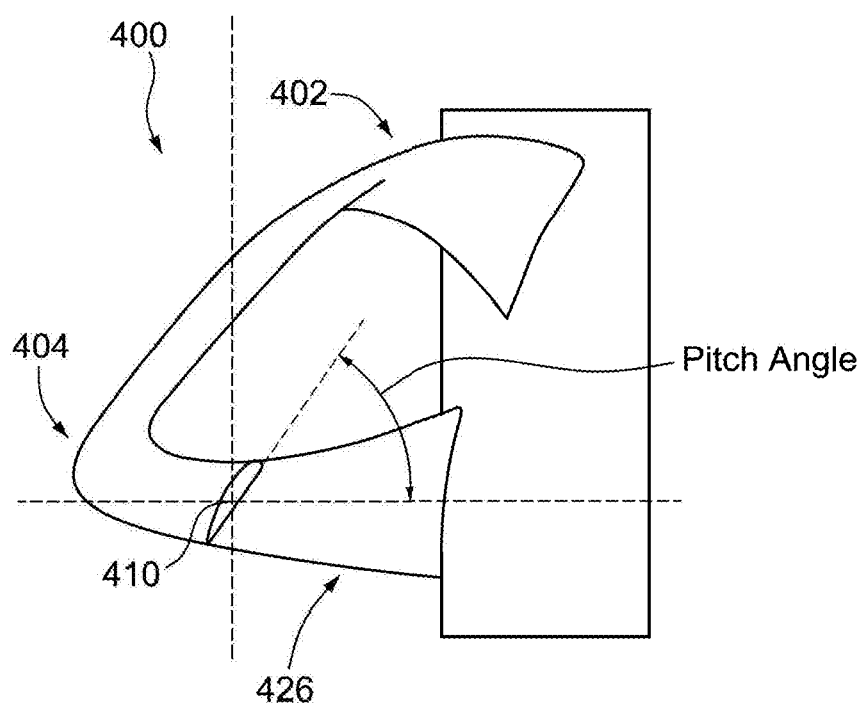
Figure 9F:
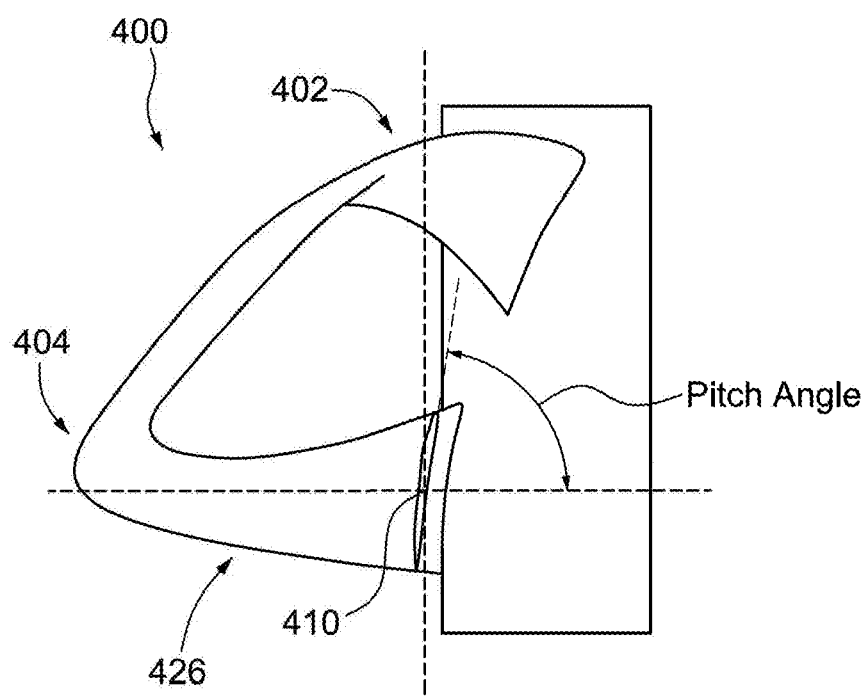

FIG. 8H depicts illustrative relative chord values from an intake root of a blade to exhaust root. In an illustrative embodiment chord decreases from intake root 132 and then begins to increase toward exhaust portion 126 and continues to increase to exhaust root 134. In other illustrative embodiments, chord increases from intake root 132 and then decreases toward exhaust portion 126 and continues to decrease to exhaust root 134.

In illustrative embodiments tip portion 122 from the tip portion intake end to the tip portion exhaust end exhibits one or more of the following characteristics:

average non-axial greater than average axial lift;

non-axial lift from the tip portion intake end to the tip portion exhaust end;

zero alpha value throughout;

positive pitch angle throughout;

positive pitch distance throughout positive pitch angle throughout a portion between 70% and 95% of tip portion 122 a maximum blade radius value within the tip portion extending from a parameter section having a roll value of 80 degrees to a parameter section having a roll value of 95 degrees.

The chart below provides illustrative values for selected parameter sections. The parameter sections are 2, 6, 11, 19, 25 and 29 from a blade defined by 30 parameter sections. Parameter section 2 is the closest of the selected parameter sections to intake root 132. Parameter section 29 is the closest of the selected parameter section to exhaust root 134.

| Section & FIG. Numbers | Radius (inches) | Pitch (inches) | Skew° | Pitch Angle (Phi) | Roll (Psi) |
|---|---|---|---|---|---|
| SECT. 2 FIG. 5A | 0.860 | 9.899 | 3.139 | 61.38 | 0.57 |
| SECT. 6 FIG. 5B | 2.000 | 9.396 | 12.615 | 36.79 | 3.34 |
| SECT. 11 FIG. 5C | 3.278 | 9.366 | 25.043 | 24.45 | 11.98 |
| SECT. 19 FIG. 5D | 4.335 | 10.248 | 46.069 | 20.62 | 91.38 |
| SECT. 25 FIG. 5E | 2.674 | 11.197 | 62.206 | 33.68 | 172.24 |
| SECT. 29 FIG. 5F | 0.941 | 12.035 | 73.241 | 63.85 | 178.62 |

FIGS. 5A-F provide a schematic representation of parameter sections 2, 6, 11, 19, 25 and 29, respectively. As noted above, FIGS. 5A-F depict parameter sections having an Alpha value of zero. In an illustrative embodiment these parameter sections may be part of a group of parameter section all having a zero alpha value that form a propeller blade.

Referring to FIGS. 5A-F, it can be seen that the radius increases from parameter section 2 through parameter section 19 and then is decreasing at parameter section 25 through parameter section 29. Pitch, skew and roll increase throughout parameter sections 2, 6, 11, 19, 25 and 29. Pitch angle decreases from parameter section 2 through parameter section 25 and then shows an increase at parameter section 29.

FIGS. 9A-F provide a schematic representation of pitch angle for parameter sections 2, 6, 11, 19, 25 and 29, respectively. Pitch angle varies throughout the blade with the largest values occurring at the intake and exhaust roots.

FIGS. 7A-D depict representations of parameter sections 6, 11, 19 and 25 of 30 parameter sections defining a blade shown in the table below. These parameters include varying Alpha values. The chart below provides illustrative values for the selected parameter sections.

Figure 7A:
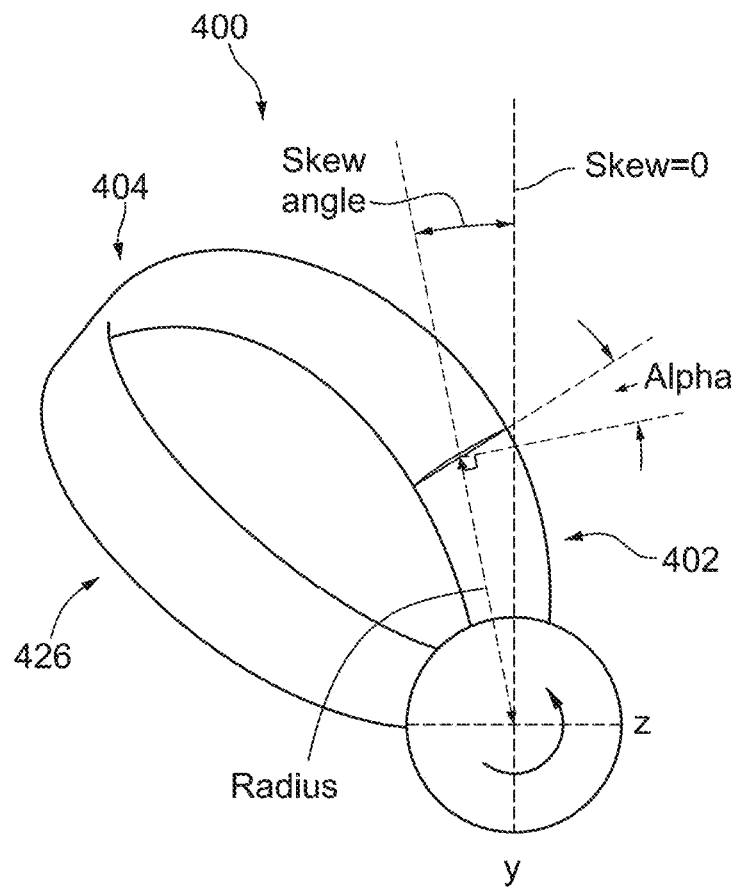
FIGS. 7A-D depict examples of alpha and radius values for selected parameter sections.
Figure 7B:
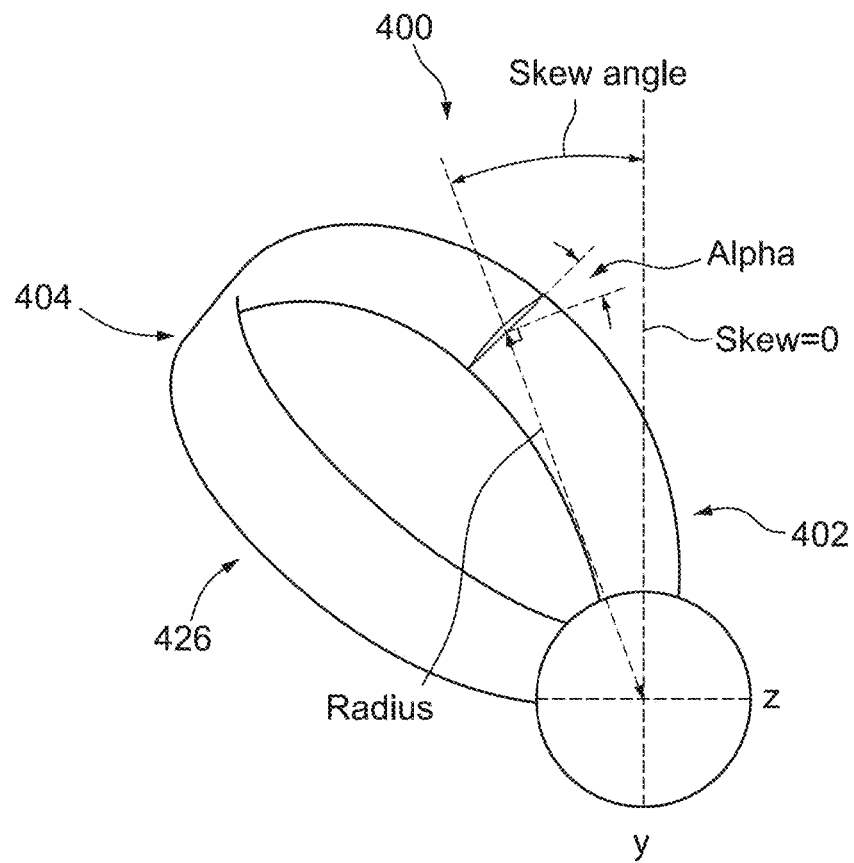
Figure 7C:
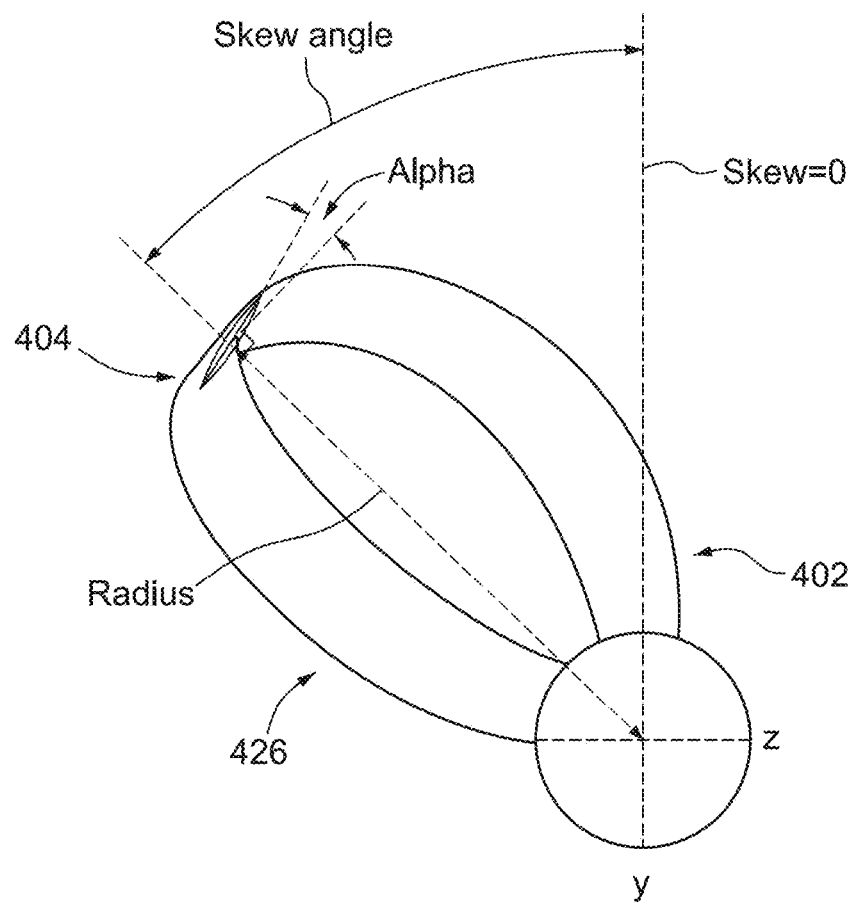
Figure 7D:
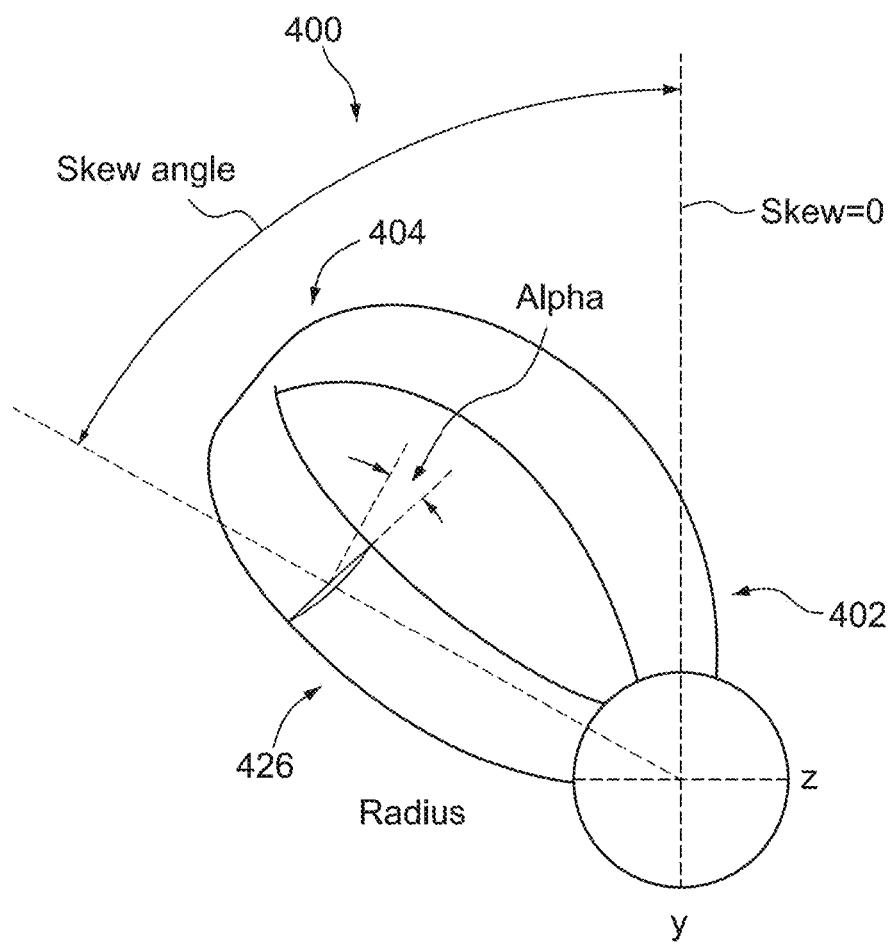

| Section & Figure Numbers | Radius (inches) | Pitch (inches) | Skew° | Pitch Angle (Phi) | Roll (Psi) | Vertical Angle (Alpha) |
|---|---|---|---|---|---|---|
| SECT. 6 FIG. 7A | 2.000 | 9.396 | 12.615 | 36.79 | 3.34 | 16.74 |
| SECT. 11 FIG. 7B | 3.278 | 9.366 | 25.043 | 24.45 | 11.98 | 16.34 |
| SECT. 19 FIG. 7C | 4.335 | 10.248 | 46.069 | 20.62 | 91.38 | 11.75 |
| SECT. 25 FIG. 7D | 2.674 | 11.197 | 62.206 | 33.68 | 172.24 | −14.80 |

Radius, Pitch, Skew, Pitch Angle and Roll are given the same values as the illustrative example having Alpha equal to zero. In the embodiment represented by FIGS. 7A-D Alpha decreases through parameter sections 6 through 19 and then becomes negative at a location on the blade between parameter section 19 and 25. This change is illustrated in FIGS. 7A-D.

It is noted that throughout where values are associated with section parameters, the values may define blade portions as each of the intake, tip and exhaust portions are defined herein.

Illustrative embodiments of the propeller may have one or more of the following characteristics and any characteristics described herein:
throughout at least a portion of tip portion 122 on the intake side 90 degree roll, the distance (N) to the nose of a parameter section as measured perpendicularly from hub axis 103 is greater than the distance (T) to the tail of the parameter section as measured perpendicularly from the hub axis;
80% of the tip portion has a roll value of less than 90 degrees and N>T for the same 80% of the tip portion;
average pitch angle of exhaust portion 126 is greater than the average pitch of intake portion 124;
pitch angle varies as roll varies;
pitch angle is positive throughout the blade;
length of entire leading edge of propeller blade is greater than the length of the entire trailing edge as measure perpendicularly from the propeller axis;
first rake position (intake root) is less than the last (exhaust root) rake position thus there is a resulting gap between the intake root and the exhaust root with the exhaust root aft of the intake root;
skew increases from intake root 132 to exhaust root 134;
intake root is forward of exhaust root and skew begins at zero and ends at a positive value;
intake root is aft of exhaust root and skew starts at zero and ends at a negative value;
the entire intake portion is forward of the exhaust portion except for tip region.
the greatest thickness of the blade cross-section is between the midpoint of the chord and the leading edge of the cross-section;
the pressure face continues to turn toward the tip on the intake portion and then becomes suction face on the exhaust portion;
intake root 132 is in-line with exhaust root 134 so skew is zero;
substantial mixing of jet stream and free stream downstream of the exhaust blade compared to traditional propellers;
blades are configured to "effectively increase" the diameter of the propeller by increasing mixture of free stream and jet stream;
pitch angle of the exhaust blade at its root end is greater than the pitch angle of the intake blade at its root end;
the tip portion has a 90 degree roll angle closer to the exhaust portion than to the intake portion;
a gap between the intake portion root and the exhaust portion root;
chord length of parameter sections varying throughout the blades;
parameter sections defining the blade are planar and perpendicular to the median line;
Some or all of the parameter sections defining the blade are non-planar, cylindrical to the median line.
negative rake in the exhaust portion;
positive rake in the exhaust portion and
blades of different configuration are incorporated into a single propeller.

Propeller variations can have the same median line but vary in other parameters. A series of propellers according to illustrative embodiments of the invention can be based on a common median line with varying parameter section pitch, angle of attack, angle, rake, surface area, area ratio, spline form, cross-sectional profile, chord length, vertical angle, roll and other blade parameters.

FIGS. 14A-B, 15A-B, 16A-B and 17A-B depict side views and cross-sectional views of propellers with two blades, three blades, four blades and seven blades, respectively. Cross-sections are taken viewed from the propeller fore location along the rotational axis. The cross-sections are generally in tip portion 122 of the blade. As can been seen in each of the cross-sectional drawings, for each cross-sectional profile of the blade, the distance A from the rotational axis to the leading edge of the blade cross section is greater than the distance B from the rotational axis to the trailing edge of the blade cross section in these particular areas of tip portion 122. In an illustrative embodiment of the invention A is greater than B for all of tip portion 122. In further illustrative embodiments of the invention A is greater than B for 50 percent to 100 percent of tip portion 122. In a further embodiments the percent of tip portion 122 that has A greater than B is in the range of 85 percent to 90 percent. In general, the greater the difference between the length of A band B the more fluid will be pulled in from a non-axial direction. Similarly, the greater the percent of the blade that has A greater than B, the more fluid will be pulled in from a non-axial directions.

Figure 13A:
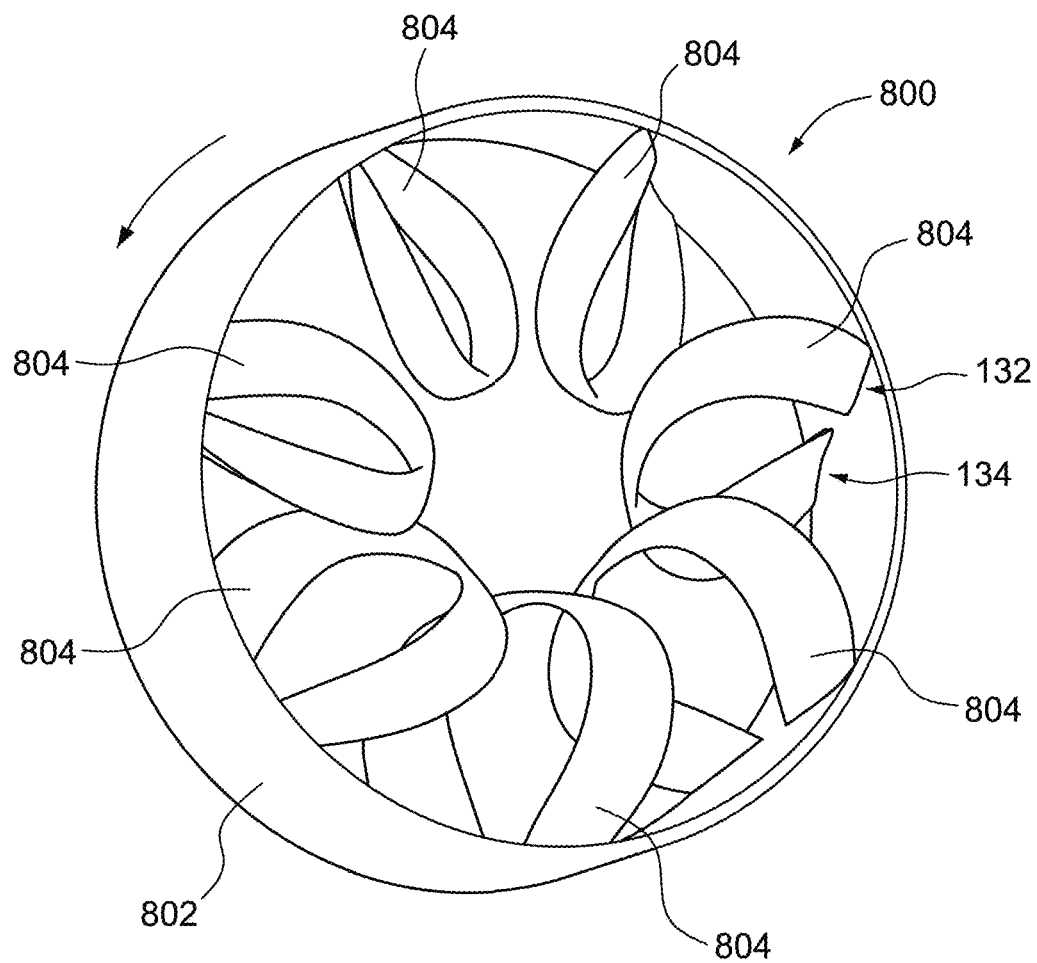
FIGS. 13A-G depict a propeller without a hub and having a ring from which propeller blades extend.
Figure 13B:
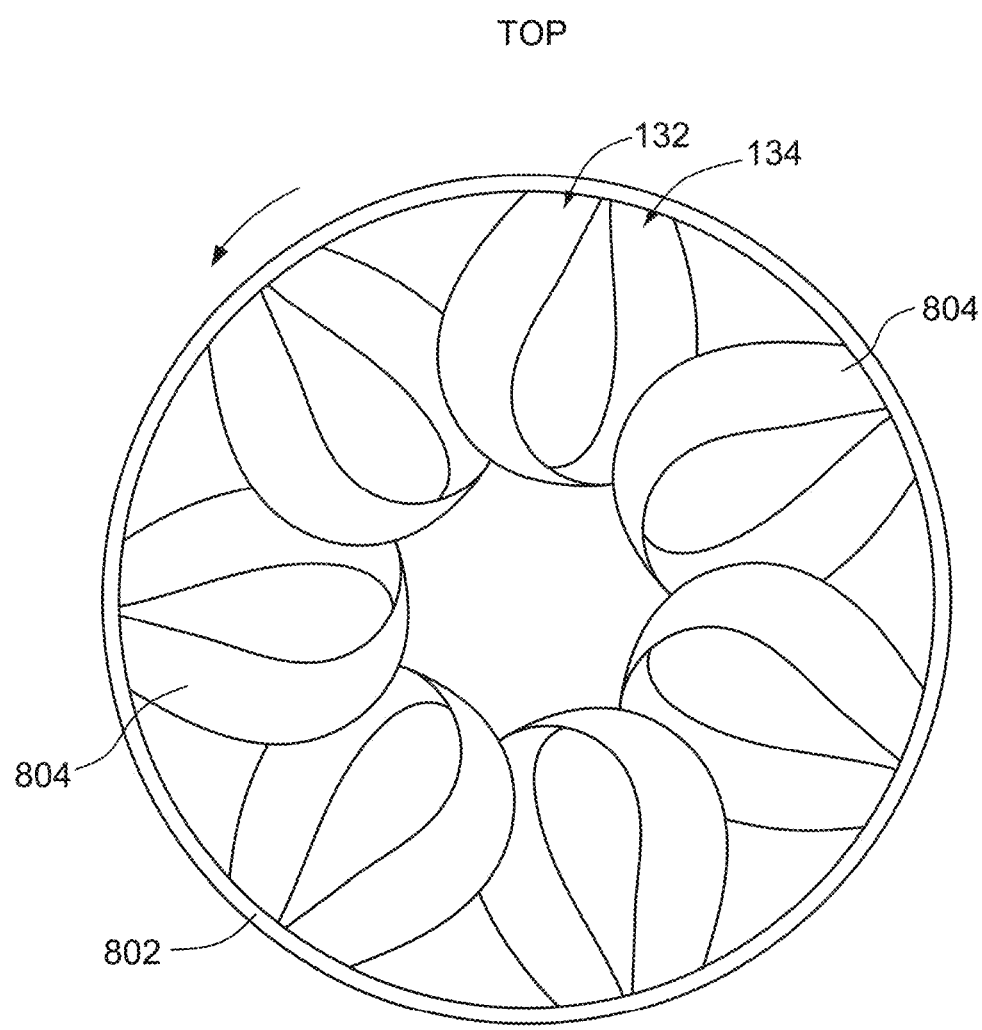
Figure 13C:
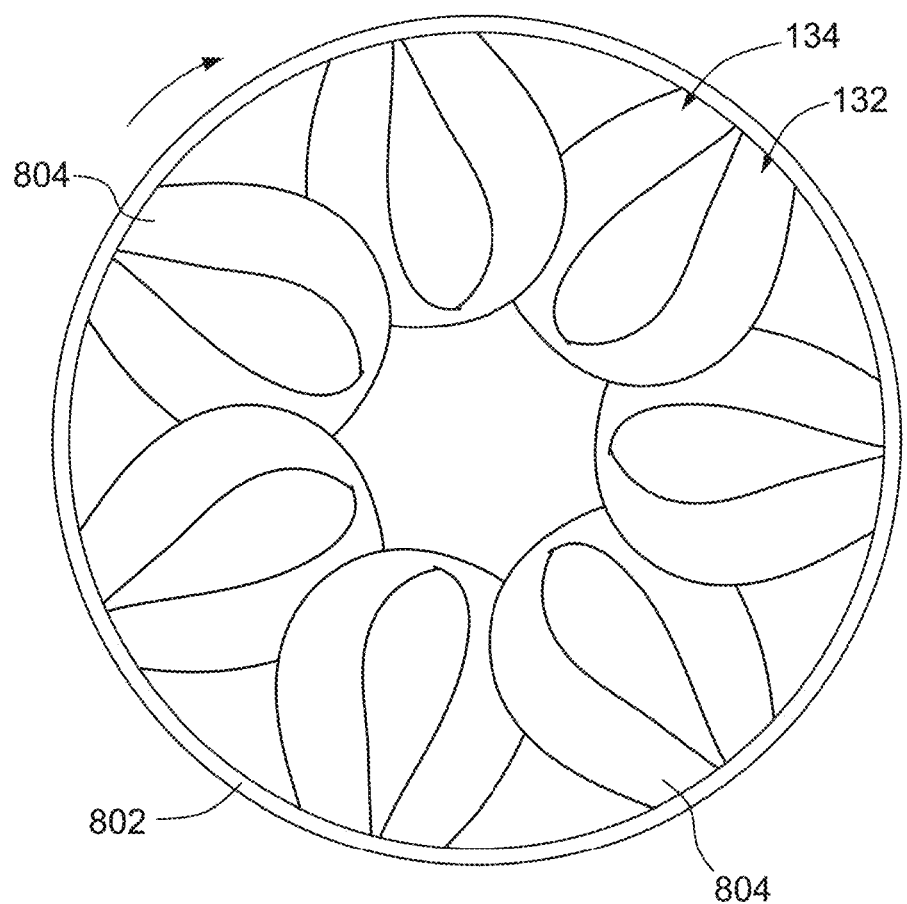
Figure 13D:
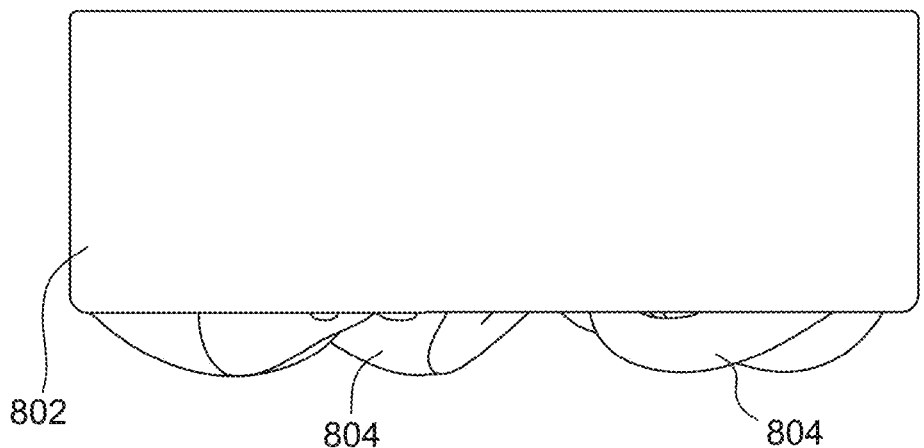
Figure 13E:
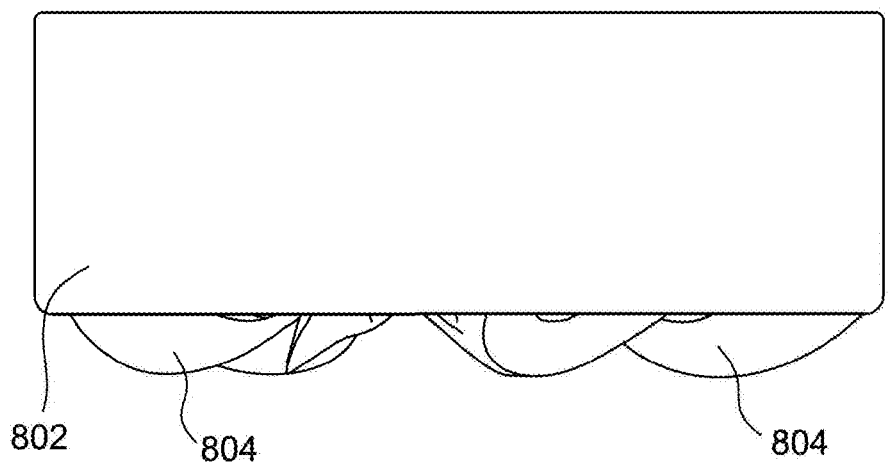
Figure 13F:
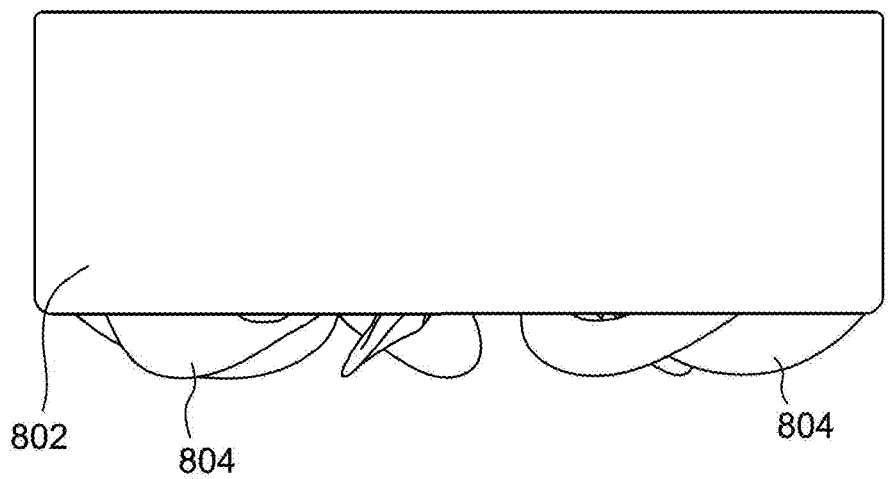
Figure 13G:
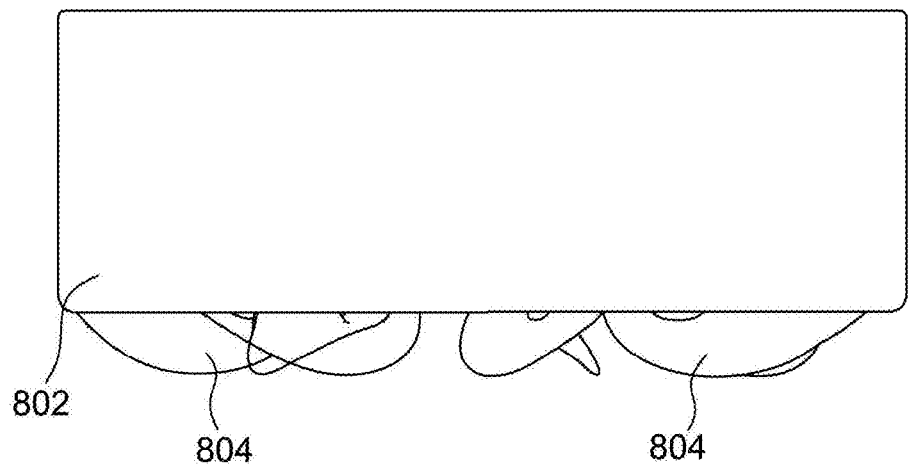
Figure 14A:
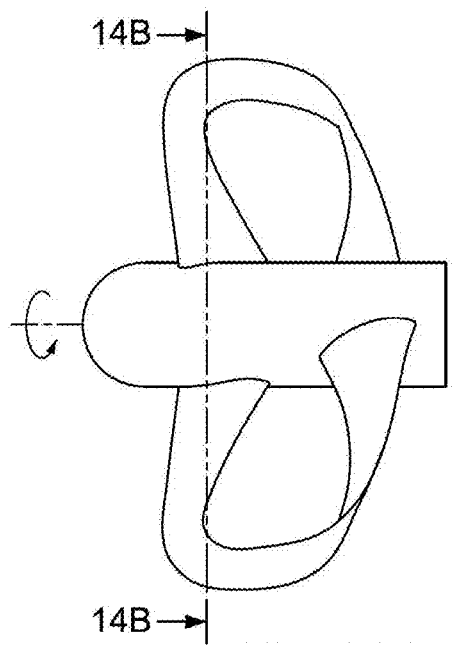
FIGS. 14A-B depict a two blade propeller and a cross-section thereof.
Figure 14B:
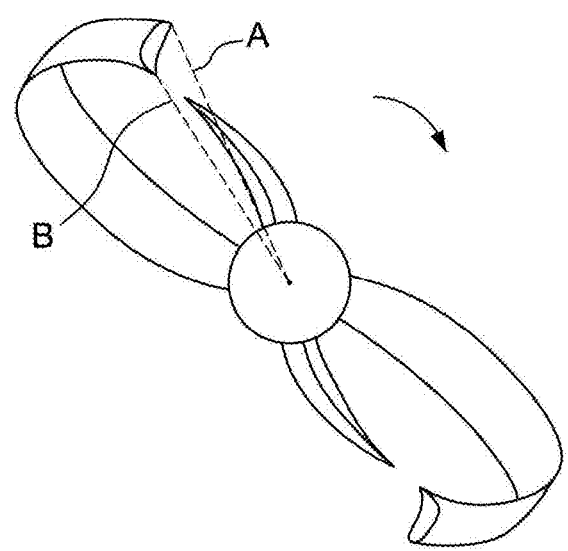
Figure 15A:
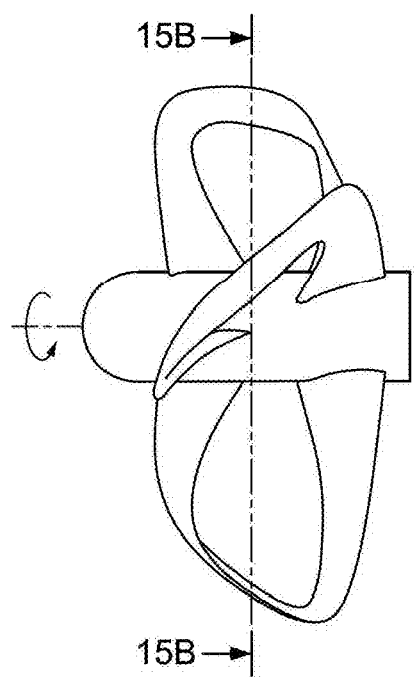
FIGS. 15A-B depict a three blade propeller and a cross-section thereof.
Figure 15B:
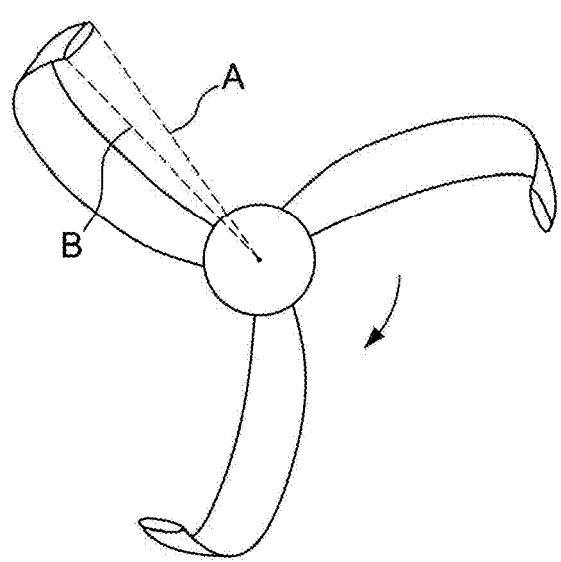
Figure 16A:
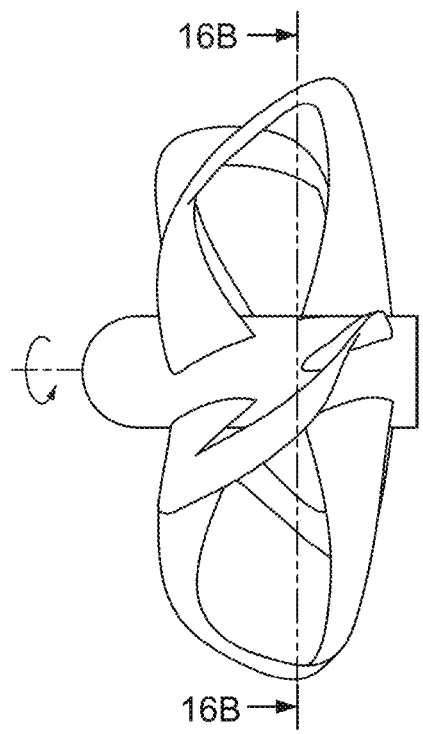
FIGS. 16A-B depict a five blade propeller and a cross-section thereof.
Figure 16B:
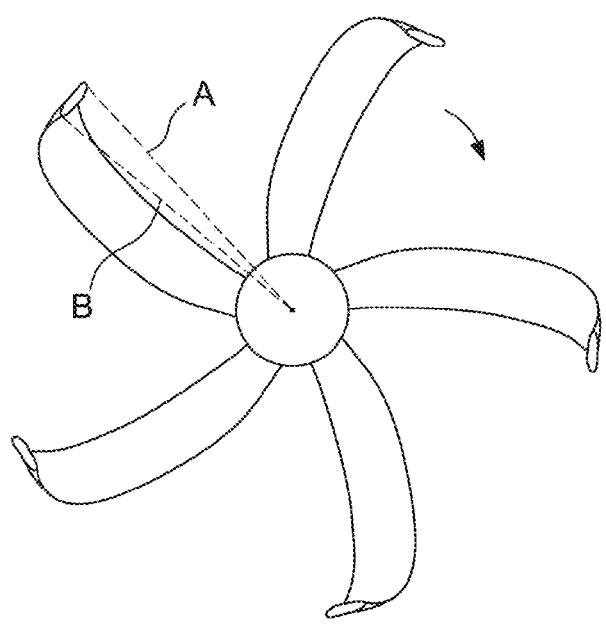
Figure 17A:
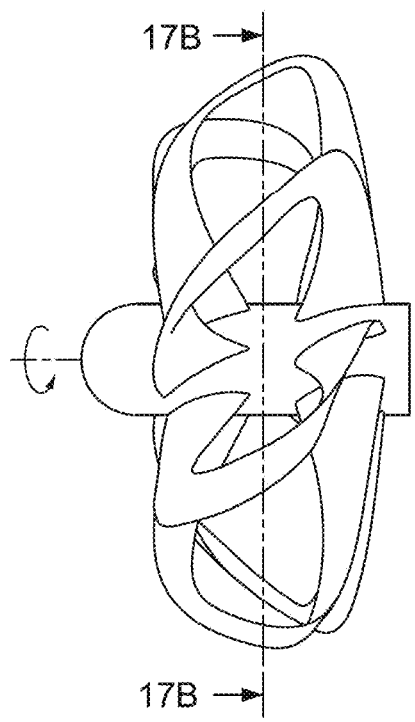
FIGS. 17A-B depict a seven blade propeller and a cross-section thereof.
Figure 17B:
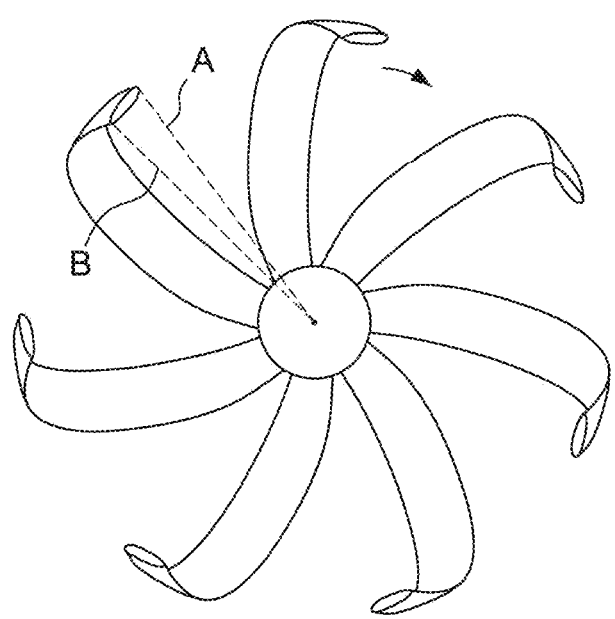

Illustrative embodiments have been depicted or described as a propeller having a hub. The blades described herein may also be used in a hubless propeller device such as shown in FIGS. 13A-G. FIG. 13A is a perspective view of a "hubless" propeller 800. In this embodiment there are seven blades 804, each having their intake root 132 and exhaust root 134 extending from a rim 802, with tip portion 122 toward the center of the propeller. FIGS. 13B-G show views from the top, bottom, "front," "back," "left," and "right," respectively. The terms "left," "right," "front" and "back" are used for description purposes only to distinguish views from 90 degree intervals around the propeller, but as a circular device, have no literal meaning. The blades follow the same or similar characteristics as propellers with hubs, with some varied air flow due to the rim.

Further disclosed is a method for creating a propeller according to any of the embodiments described herein. In an exemplary embodiment a plurality of independently modifiable orientation and shape variables are provided to define the orientation and shape of a plurality of parameter sections forming a propeller blade. The shape and orientation variables can be any combination of those disclosed herein. The parameter sections may be planar or cylindrical. In an illustrative embodiment the variables are modified to direct and redirect lift as desired, such as described herein. The configured parameter sections are then used to form a blade by extrapolating between parameter sections to form smooth lines. The method may be used to form any blade as described herein.

The invention includes several different devices having the disclosed propeller incorporated therein. For example, the invention includes the following illustrative devices: propulsors, shrouded propellers, encased propellers, impellers, aircraft, watercraft, turbines, including wind turbines, cooling devices, heating devices, automobile engines, unmanned aerial vehicles, turbofans (hydrojets), air circulation devices, compressors, pump jets, centrifugal fans, jet engines and the like. The invention also includes methods of manufacturing and designing a propeller, including any of the above-listed devices, according to any of the embodiments described, pictured or claimed herein; a method of manufacturing a device comprising any of the aforementioned propellers; a method of manufacturing a product wherein the method includes installing a device containing any of the aforementioned propellers.

The ratio of the roll to distance along the median line may be a factor in whether a particular propeller is suitable for an application. For example, a greater roll per given distance creates a more squat blade profile and thus may be more suitable for application as a fan for a cooling or ventilating device.

Figure 10A:
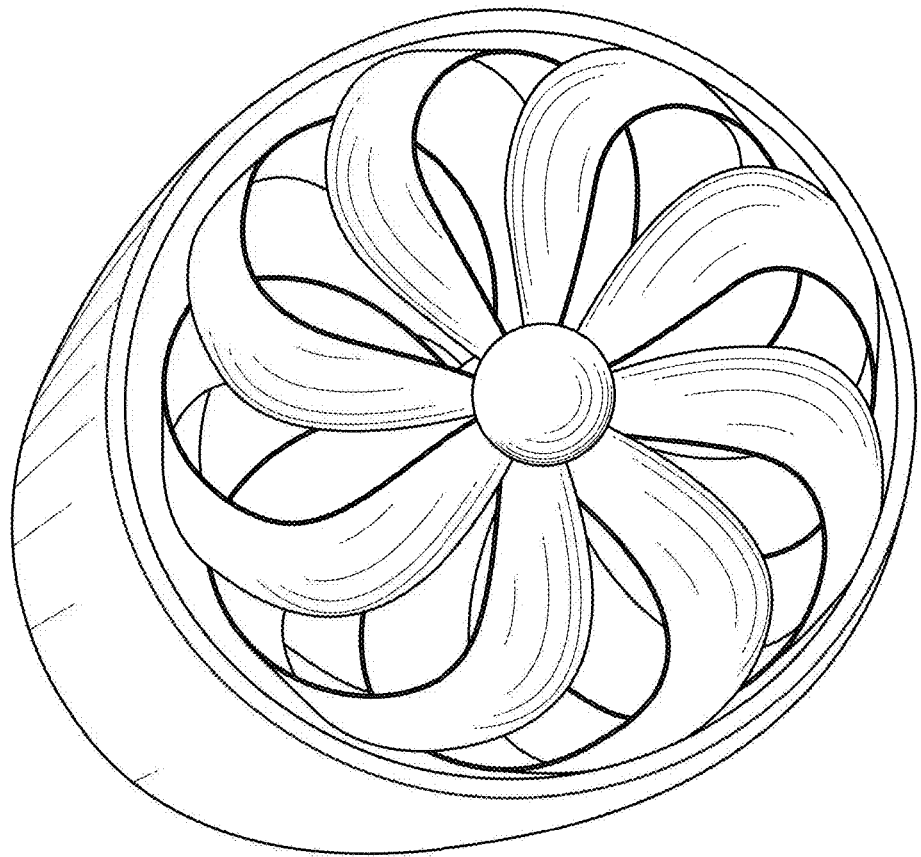
FIGS. 10A-B depict views of a turbofan.
Figure 10B:
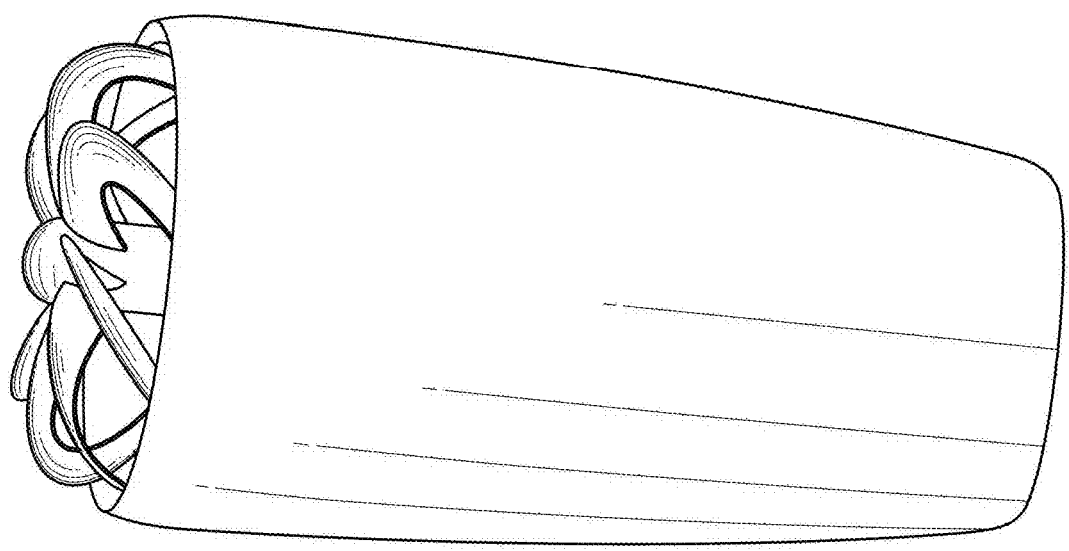

In an illustrative embodiment, a propeller as described herein is incorporated into a turbofan as shown, for example, in FIGS. 10A and 10B. The turbofan may have, for example, between eight and twelve blades. It is noted that the blades depicted in FIGS. 10A-B are not necessarily of a type described herein. The figures are merely provided to indicate the type of device.

Figure 11:
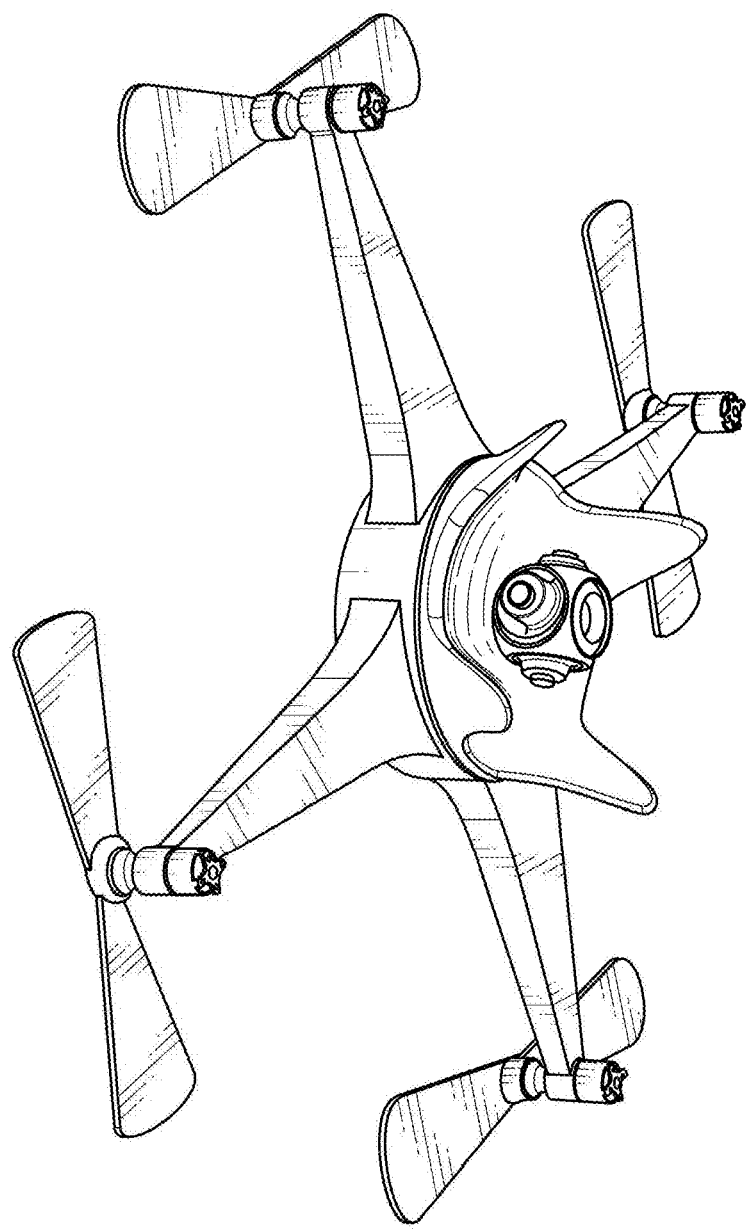
FIG. 11 depicts an unmanned aerial vehicle.
Figure 12A:
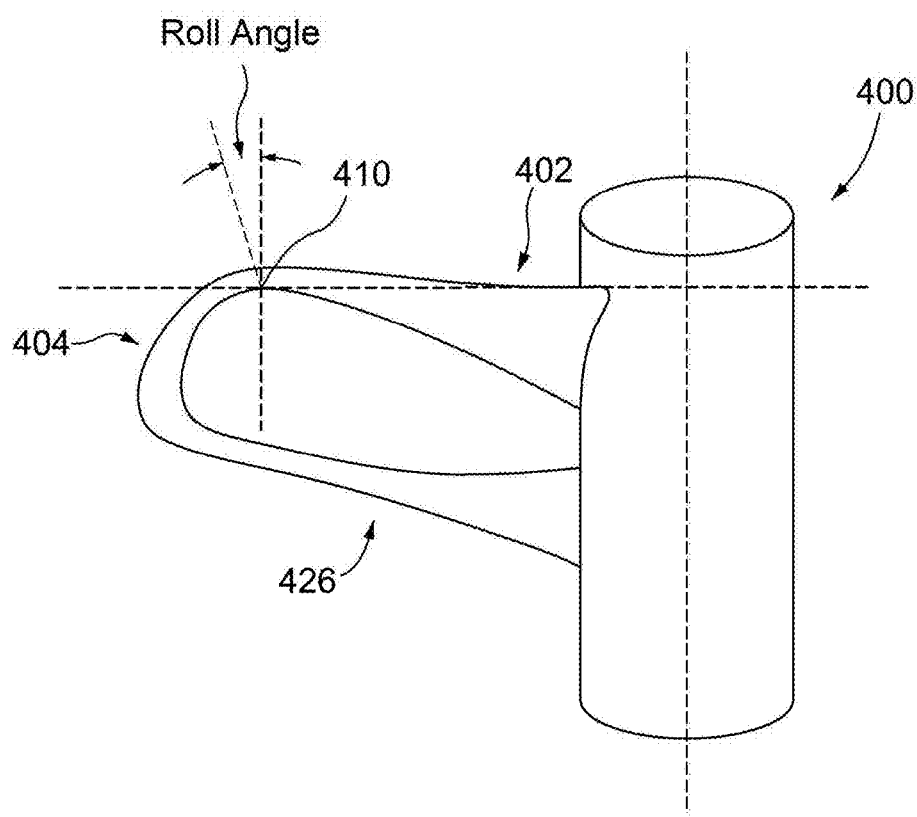
FIGS. 12A-C depict roll angle for selected parameter sections.
Figure 12B:
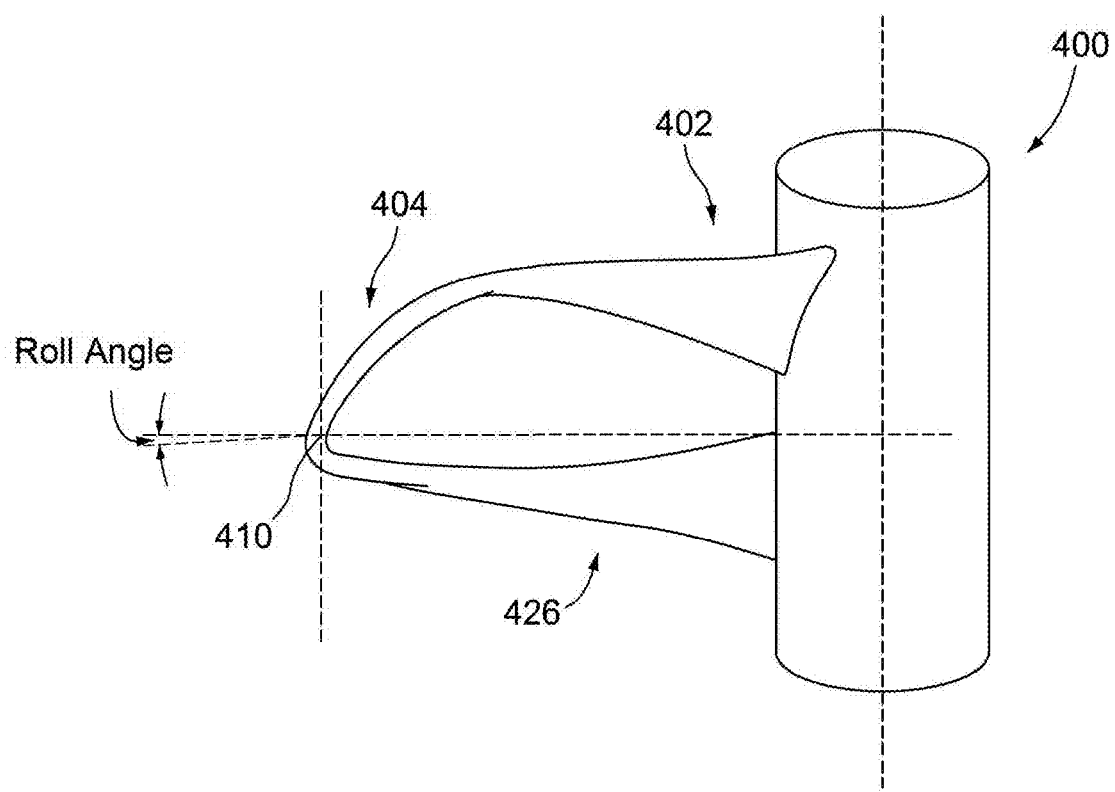
Figure 12C:
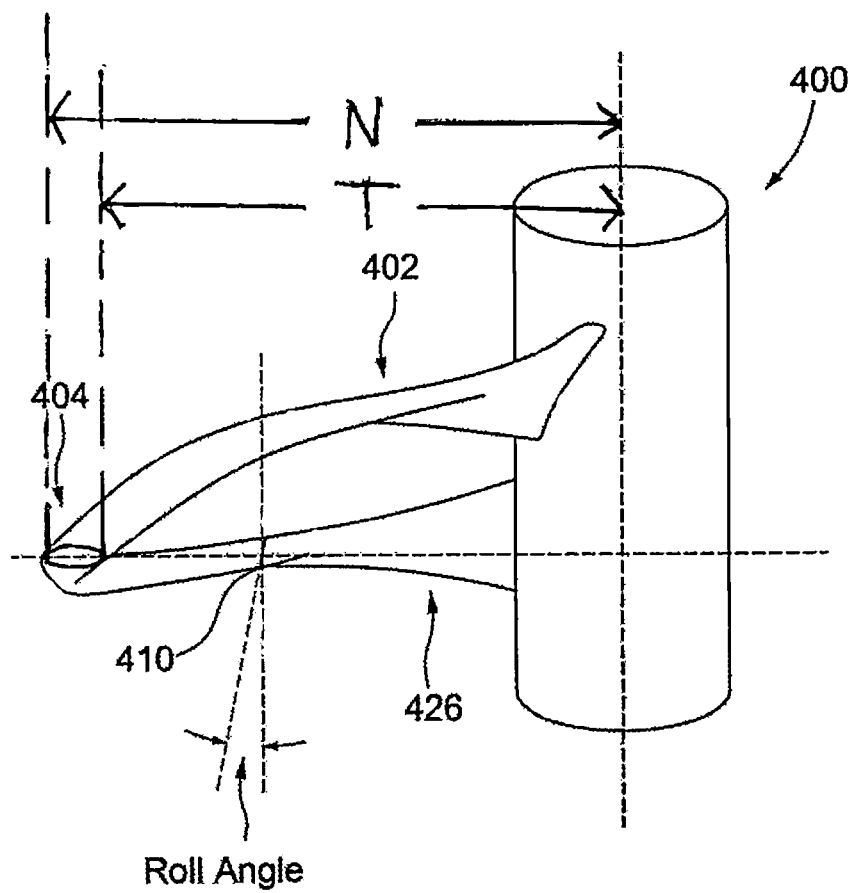

In a further illustrative embodiment of the invention a propeller as described herein is incorporated into an unmanned aerial vehicle or device such as shown for example, in FIG. 11. It is noted that the blades depicted in FIG. 11 are not necessarily of a type described herein. The figures are merely provided to indicate the type of device.

Various embodiments and view of illustrative propellers are provided in FIGS. 18A-G, FIGS. 19A-G, FIGS. 20A-I and FIGS. 21A-G. Views including from the top, bottom, "front," "back," "left," "right," and perspective views are provided and labeled on the drawings. The terms "left," "right," "front" and "back" are used for description purposes only to distinguish views from 90 degree intervals around the propeller, but as a circular device, the terms have no significance. FIGS. 18A-G depict an illustrative embodiment of a propeller with a high rake value for intake portion of the blade. FIGS. 19A-G depict a further illustrative embodiment of a propeller with a high rake value for intake and exhaust. FIGS. 20A-I depict an inboard propeller. FIGS. 21A-G depict a propeller with a through hub exhaust for an outboard motor.

Various embodiments of the invention have been described, each having a different combination of elements. The invention is not limited to the specific embodiments disclosed, and may include different combinations of the elements disclosed or omission of some elements and the equivalents of such structures.

While the invention has been described by illustrative embodiments, additional advantages and modifications will occur to those skilled in the art. Therefore, the invention in its broader aspects is not limited to specific details shown and described herein. Modifications, for example, the number of blades and curvature of the blades, may be made without departing from the spirit and scope of the invention. Accordingly, it is intended that the invention not be limited to the specific illustrative embodiments, but be interpreted within the full scope of the appended claims and their equivalents.

The invention claimed is:

1. A propeller comprising:
a plurality of blades, each of the plurality of blades having an intake portion, an exhaust portion, and a tip portion extending from the intake portion to the exhaust portion;
a hub;
the plurality of blades, each blade forming a loop-extending outward from the hub and disposed around the hub, each blade connected with the hub via a root of the intake portion and a root of the exhaust portion, wherein the root of the exhaust portion is forward of the root of the intake portion when extending outward from the hub;
each blade comprising a plurality of parameter sections having selected one or more of the parameters including skew angle, roll angle, rake, radius, pitch angle, and vertical angle values;
a parameter section of the plurality of parameter sections at the transition from the intake portion to the tip portion defined by parameters to cause the amount of non-axial lift in the tip portion to be greater than the axial lift in the tip portion; and
a parameter section of the plurality of parameter sections or an area between consecutive parameter sections of the plurality of parameter sections in the tip portion having a roll value of 90 degrees.

2. The propeller of claim 1 comprising the plurality of blades each having an irregular helical median line.

3. The propeller of claim 1 wherein the plurality of blades are configured so non-axial lift in the intake portion is less than non-axial lift in tip portion.

4. The propeller of claim 1 wherein the plurality of blades are configured so the amount of non-axial lift in the exhaust portion is less than the non-axial lift in the tip portion.

5. The propeller of claim 1 wherein the tip portion has a 90 degree roll angle closer to the exhaust portion than to the intake portion.

6. The propeller of claim 1, wherein the plurality of parameter sections include the root of the exhaust portion forward of the root of the intake portion when extending outward from the hub, and skew continually decreases.

7. The propeller of claim 1, wherein the plurality of parameter sections are aligned along a non-helical median line.

8. The propeller of claim 1, wherein one or more selected parameters for one or more of the plurality of parameter sections are defined to cause the amount of non-axial lift in the intake portion to be less than the non-axial lift in tip portion.

9. The propeller of claim 1, wherein one or more selected parameters for one or more of the plurality of parameter sections are defined to cause the amount of non-axial lift in the exhaust portion to be less than the non-axial lift in the tip portion.

10. The propeller of claim 1, wherein the plurality of parameter sections are planar.

* * * * *